US008777483B2

(12) United States Patent
Yamawaku et al.

(10) Patent No.: US 8,777,483 B2
(45) Date of Patent: Jul. 15, 2014

(54) TEMPERATURE MEASURING APPARATUS AND TEMPERATURE MEASURING METHOD

(75) Inventors: Jun Yamawaku, Nirasaki (JP); Chishio Koshimizu, Nirasaki (JP); Tatsuo Matsudo, Nirasaki (JP); Kenji Nagai, Nirasaki (JP)

(73) Assignee: Tokyo Electron Limited (JP)

( * ) Notice: Subject to any disclaimer, the term of this patent is extended or adjusted under 35 U.S.C. 154(b) by 265 days.

(21) Appl. No.: 13/231,027

(22) Filed: Sep. 13, 2011

(65) Prior Publication Data

US 2012/0063486 A1 Mar. 15, 2012

Related U.S. Application Data

(60) Provisional application No. 61/386,122, filed on Sep. 24, 2010.

(30) Foreign Application Priority Data

Sep. 14, 2010 (JP) ................. 2010-205401

(51) Int. Cl.
*G01K 1/00* (2006.01)
*G01J 5/00* (2006.01)

(52) U.S. Cl.
USPC .......................................... 374/120; 374/130

(58) Field of Classification Search
USPC .................................................. 374/120, 130
See application file for complete search history.

(56) References Cited

U.S. PATENT DOCUMENTS

2006/0152734 A1* 7/2006 Suzuki et al. ................. 356/479

FOREIGN PATENT DOCUMENTS

| JP | 10311708 | 11/1998 |
|----|----------|---------|
| JP | 2002310729 | 10/2002 |
| JP | 2006-112826 | 4/2006 |
| JP | 2008216182 | 9/2008 |

* cited by examiner

*Primary Examiner* — Mirellys Jagan
(74) *Attorney, Agent, or Firm* — Cantor Colburn LLP

(57) ABSTRACT

The temperature measuring apparatus includes: a light source; a first wavelength-dividing unit which wavelength-divides a light from the light source into m lights whose wavelength bands are different from one another; m first dividing units which divides each of the m lights from the first wavelength-dividing unit into n lights; a transmitting unit which transmits lights from the m first dividing unit to measurement points of an object to be measured; a light receiving unit which receives a light reflected by each of the measurement points; and a temperature calculating unit which calculates a temperature of each of the measurement points based on a waveform of the light received by the light receiving unit.

21 Claims, 20 Drawing Sheets

TEMPERATURE MEASURING APPARATUS AND TEMPERATURE MEASURING METHOD

CROSS-REFERENCE TO RELATED PATENT APPLICATIONS

This application claims the benefit of Japanese Patent Application No. 2010-205401, filed on Sep. 14, 2010, in the Japan Patent Office, and U.S. patent application Ser. No. 61/386,122, filed on Sep. 24, 2010, in the United States Patent and Trademark Office, the disclosures of which are incorporated herein in their entireties by reference.

BACKGROUND OF THE INVENTION

1. Field of the Invention

The present invention relates to a temperature measuring apparatus and a temperature measuring method, which can measure a temperature of an object to be measured (for example, a semiconductor wafer or a liquid crystal substrate) in a non-contact manner.

2. Description of the Related Art

Accurately measuring a temperature of a substrate (for example, a semiconductor wafer) to be processed by using a substrate processing apparatus is very important in order to accurately control shapes, properties, and so on of films or holes formed on or in the semiconductor wafer based on a result of various processes such as film formation and etching. Accordingly, a temperature of a semiconductor wafer has been measured by using various conventional methods such as a temperature measuring method using a fluorescent thermometer for measuring a temperature of a rear surface of a base material, a resistance thermometer, or the like.

Recently, a temperature measuring technology using a low-coherence interferometer which can directly measure a temperature of a semiconductor wafer, which is difficult to do with the conventional temperature measuring methods, has been developed. Also, as the temperature measuring technology using the low-coherence interferometer, a technology has been suggested in which a light from a light source is divided into a measurement light for temperature measurement and a reference light by a first splitter, the measurement light is divided into n measurement lights by a second splitter, the n measurement lights are emitted to n measurement points, and interference between reflected lights of the n measurement lights and a reflected light of the reference light reflected by a reference light reflecting unit is measured to simultaneously measure temperatures of the plurality of (n) measurement points (refer to, for example, Patent Document 1).

However, in the above conventional technology, since a number of measurement points are limited by a number of lights obtained by the second splitter, it is difficult to measure temperatures of more measurement points as needed.

[Patent Document 1] Japanese Laid-Open Patent Publication No. 2006-112826

SUMMARY OF THE INVENTION

Considering the problems of the conventional technology, an objective of the present invention is to provide a temperature measuring apparatus and a temperature measuring method which can simply measure temperatures of more measurement points.

According to an aspect of the present invention, there is provided a temperature measuring apparatus including: a light source; a first wavelength-dividing unit which wavelength-divides a light from the light source into m lights whose wavelength bands are different from one another; m first dividing units which divide each of the m lights from the first wavelength-dividing unit into n lights; a transmitting unit which transmits lights from the m first dividing unit to measurement points of an object to be measured; a light receiving unit which receives a light reflected by each of the measurement points; and a temperature calculating unit which calculates a temperature of each of the measurement points based on a waveform of the light received by the light receiving unit.

According to another aspect of the present invention, there is provided a temperature measuring method including: wavelength-dividing a light from a light source into m lights whose wavelength bands are different from one another by using a first wavelength-dividing unit; dividing each of the m light from the first wavelength-dividing unit into n lights by using m first dividing units; transmitting lights from the m first dividing units to measurement points of an object to be measured by using a transmitting unit; receiving a light reflected by each of the measurement points by using a light receiving unit; and calculating a temperature of each of the measurement points based on a waveform of the light received by the light receiving unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Embodiments for Carrying Out the Invention

Figure 1:
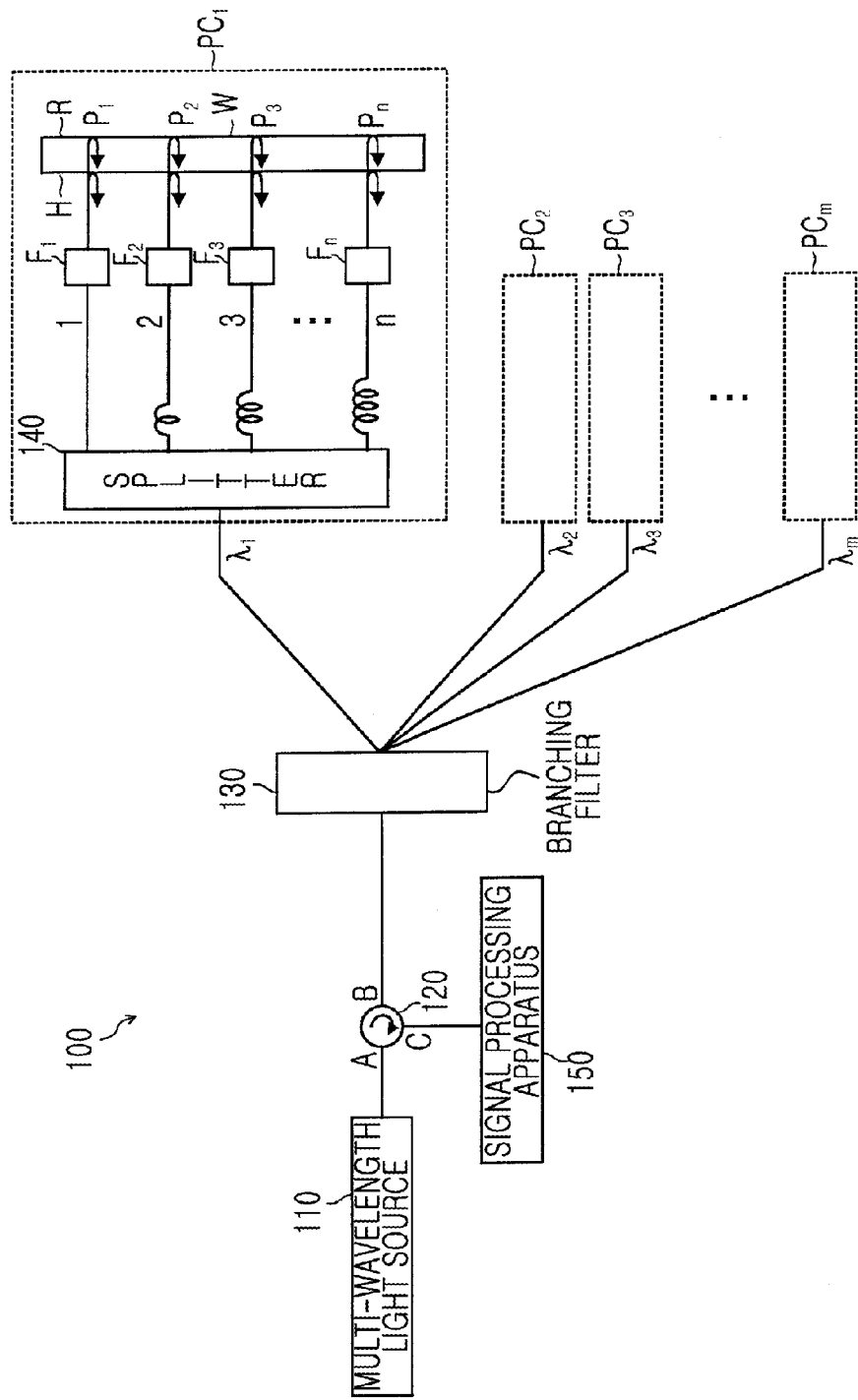
FIG. 1 is a diagram showing a configuration of a temperature measuring apparatus according to a first embodiment.

The present invention will now be described more fully with reference to the accompanying drawings, in which exemplary embodiments of the invention are shown. Also, in the specification and drawings, components having substantially the same functions are denoted by the same reference numerals, and a repeated explanation thereof will not be given. Also, although a semiconductor wafer is exemplarily explained as an object whose temperature is to be measured, the object whose temperature is to be measured is not limited to the semiconductor wafer and temperatures of various other objects may be measured.

First Embodiment

A first embodiment according to which temperatures of a plurality of points of semiconductor wafers in a plurality of processing chambers are measured simultaneously will be explained. In the first embodiment, since a multi-wavelength light source is used as a light source, a multi-wavelength light is wavelength-divided into a plurality of (where m is an integer equal to or greater than 1) wavelength bands $\lambda_1$ through $\lambda_m$ by a wavelength division multiplexing (WDM) coupler, and each of lights having the wavelength bands $\lambda_1$ through $\lambda_m$ is divided into a plurality of (n, n is an integer equal to or greater than 1) lights, temperatures of more measurement points than that in a conventional apparatus and method can be measured.

FIG. 1 is a diagram showing a configuration of a temperature measuring apparatus 100 according to a first embodiment. The temperature measuring apparatus 100 includes a multi-wavelength light source 110 which emits a light (hereinafter, referred to as a measurement light) having a plurality of (m) wavelength bands, an optical circulator 120, a branching filter 130 (first wavelength-dividing unit) which wavelength-divides the measurement light into m lights having wavelength bands $\lambda_1$ through $\lambda_m$, a splitter 140 (first dividing unit) which divides each of the m lights having the wavelength bands $\lambda_1$ through $\lambda_m$ obtained by the branching filter 130 into n first through nth measurement lights, and a signal processing apparatus 150 which calculates temperatures of measurement points by using reflected lights output from the optical circulator 120.

A measurement light is emitted from the multi-wavelength light source 110 at predetermined time intervals, that is, in predetermined time slots.

Although the multi-wavelength light source 110 can use an arbitrary light, if a temperature of a semiconductor wafer W is measured as shown in the first embodiment, a light whose reflected lights from a distance (generally, ranging from about 800 to 1500 μm) between a surface H and a rear surface R of the semiconductor wafer W does not cause interference may be used, and specifically, a low-coherence light may be used.

A low-coherence light refers to a light having a short coherence length. Also, since an object to be measured is the semiconductor wafer formed of silicon (Si), a low-coherence light may have a center wavelength which passes through Si, and specifically is equal to or greater than 1000 nm. Also, a coherence length may be in a range of, for example, 0.1 to 100 μm, and a coherence length may be equal to or less than 3 μm. Since the multi-wavelength light source 110 uses such a low-coherence light, obstruction due to unnecessary interference can be avoided, and interference between reflected lights from the surface H, the rear surface R, and an inner layer of the semiconductor wafer W can be easily measured.

Examples of a light source using a low-coherence light may include a super luminescent diode (SLD), a light-emitting diode (LED), a high luminance lamp (such as a tungsten lamp, or a xenon lamp), and an ultra broadband wavelength light source. From among the light sources using a low-coherence light, a SLD having a high luminance (a wavelength of, for example, 1300 nm) may be used as the multi-wavelength light source 110.

The optical circulator 120 includes three ports A through C. A light input to the port A is output from the port B, a light input to the port B is output from the port C, and a light input to the port C is output from the port A. That is, a measurement light from the multi-wavelength light source 110 is output to the branching filter 130, and a reflected light from an object to be measured from the branching filter 130 is input to the signal processing apparatus 150.

The branching filter 130 wavelength-divides a measurement light input from the optical circulator 120 into m measurement lights respectively having wavelength bands $\lambda_1$ through $\lambda_m$ and outputs the m measurement lights. The branching filter 130 is, for example, a WDM coupler. The obtained measurement lights having the wavelength bands $\lambda_1$ through $\lambda_m$ are respectively input to different processing chambers $PC_1$ through $PC_m$. Since configurations of the processing chambers $PC_1$ through $PC_m$ are the same except that wavelength bands of measurement lights input to the processing chambers $PC_1$ through $PC_m$ are different from one another, only the processing chamber $PC_1$ will be explained and an explanation of the other processing chambers $PC_2$ through $PC_m$ will not be given.

Only a measurement light having the wavelength band $\lambda_1$ from among the m measurement lights respectively having the wavelength bands $\lambda_1$ through $\lambda_m$ obtained by the branching filter 130 is input to the processing chamber $PC_1$ Accordingly, the measurement light having the wavelength band $\lambda_1$ is input to the processing chamber $PC_1$ at predetermined time intervals (in time slots).

The splitter 140 divides the measurement light having the wavelength band $\lambda_1$ obtained by the branching filter 130 into first through nth measurement lights. The splitter 140 is, for example, an optical fiber coupler. However, the present embodiment is not limited thereto, and for example, an optical waveguide type branching filter or a semi-transmissive mirror, may be used as long as it can divide a measurement light.

The first through nth measurement lights from the splitter 140 are transmitted to measurement points $P_1$ through $P_n$ of the semiconductor wafer W respectively through collimator fibers $F_1$ through $F_n$. As shown in FIG. 1, in the first embodiment, lengths of the collimator fibers $F_1$ through $F_n$ are configured to be different from one another, and thus optical path lengths of the first through nth measurement lights between the splitter 140 and the semiconductor W are different from one another so that reflected lights from the measurement points $P_1$ through $P_n$ do not overlap with one another.

Although the first through nth measurement lights reflected by surfaces H and rear surfaces R of the measurement points $P_1$ through $P_n$ of the semiconductor wafer W which is an object to be measured (hereinafter, the first through nth measurement lights reflected by measurement points $P_1$ through $P_n$ of the semiconductor wafer W are referred to as first through nth reflected lights) are output from the splitter 140 of the processing chamber $PC_1$, since the collimator fibers $F_1$ through $F_n$ are configured to have different lengths as described above, the first through nth reflected lights are output at different times from the splitter 140.

Also, units for transmitting the first through nth measurement lights are not limited to the collimator fibers $F_1$ through $F_n$, and collimator-attached optical fibers obtained by attaching collimators to front ends of optical fibers may be used. Also, reflected lights from the processing chambers $PC_1$ through $PC_m$ are wavelength-combined by the branching filter 130, and then are input to the signal processing apparatus 150 through the optical circulator 120.

Figure 2:
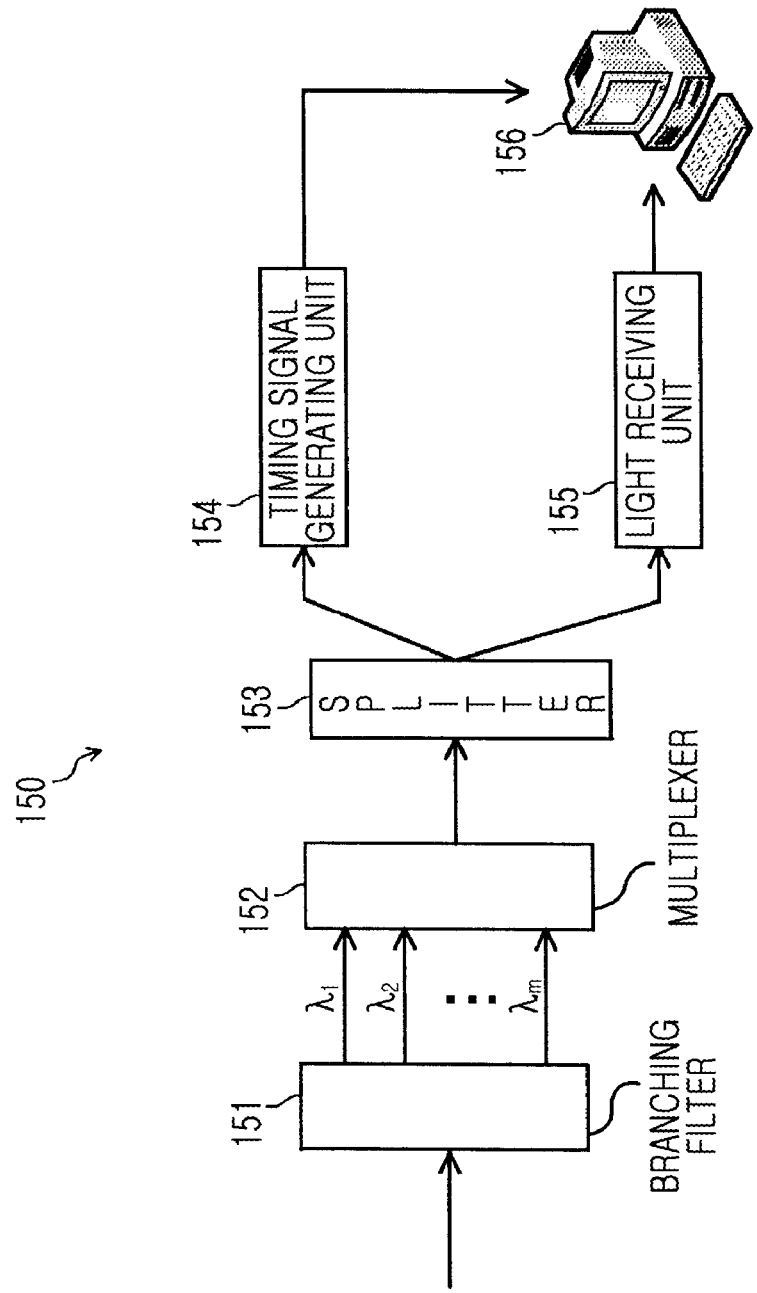
FIG. 2 is a diagram showing a configuration of a signal processing apparatus.

FIG. 2 is a diagram showing a configuration of the signal processing apparatus 150.

The signal processing apparatus 150 includes a branching filter 151 (second wavelength-dividing unit), a multiplexer 152 (input unit), a splitter 153, a timing signal generating unit 154, a light receiving unit 155, and a temperature calculating unit 156.

The branching filter 151 wavelength-divides a reflected light from the optical circulator 120 into m reflected lights respectively having wavelength bands $\lambda_1$ through $\lambda_m$ and outputs the m reflected lights. Reflected lights from the processing chambers $PC_1$ through $PC_m$ are multiplexed by the branching filter 130. Accordingly, reflected lights from the processing chambers $PC_1$ through $PC_m$ are combined and then inputted to the branching filter 151, and first through nth reflected lights are input at different times with respect to each of the m wavelength bands $\lambda_1$ through $\lambda_m$. Also, the branching filter 151 is, for example, a WDM coupler.

The multiplexer 152 is a multiplexer for optical communication, and selects and outputs any one of m reflected lights respectively having the wavelength bands $\lambda_1$ through $\lambda_m$ obtained by the branching filter 151. The multiplexer 152 selects a wavelength band at predetermined time intervals. That is, due to the multiplexer 152, one of the reflected lights having the wavelength bands $\lambda_1$ through $\lambda_m$ is selected at predetermined time intervals and is output.

A reflected light input to the branching filter 151 is wavelength-divided into reflected lights respectively having wavelength bands $\lambda_1$ through $\lambda_m$ by the branching filter 151, and one of the reflected lights having the wavelength bands $\lambda_1$ through $\lambda_m$ is selected and outputted by the multiplexer 152. Accordingly, a reflected light output from the multiplexer 152 has a selected wavelength band.

The splitter 153 divides a reflected light from the multiplexer 152 into two lights. The splitter 153 is, for example, an optical fiber coupler. However, the present embodiment is not limited thereto, and for example, an optical waveguide type branching filter or a semi-transparent mirror may be used as long as it can divide a reflected light.

The timing signal generating unit 154 generates a timing signal based on a time slot of a measurement light input from the splitter 153 and inputs the timing signal to the temperature calculating unit 156.

Figure 3:
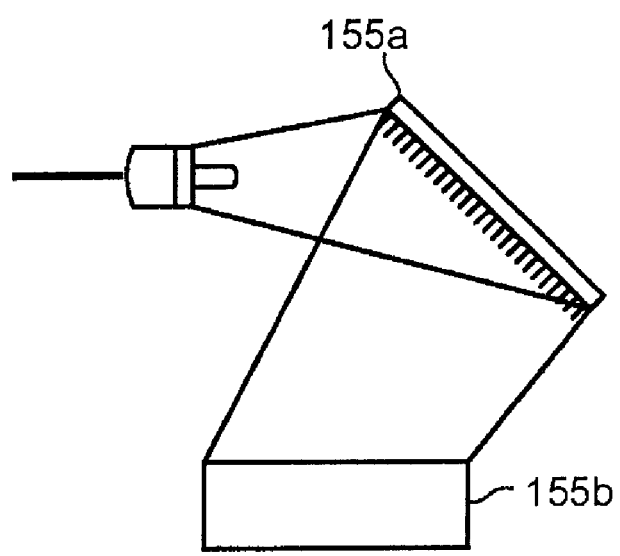
FIG. 3 is a diagram showing a configuration of a light receiving unit.

FIG. 3 is a diagram showing a configuration of the light receiving unit 155. The light receiving unit 155 includes a diffraction grating 155a which wavelength-resolves a reflected light from the splitter 153, and a photoelectric conversion device 155b which converts the wavelength-resolved reflected light into an electrical signal.

The light receiving unit 155 receives a reflected light from the multiplexer 152 based on the timing signal, and generates and outputs a discrete signal transformed to have a plurality of wavelengths.

Although the photoelectric conversion device 155b may be any of various image sensors, since a light having a wavelength equal to or greater than 1000 nm is used as a measurement light in the present embodiment, an InGaAs camera having sensitivity to a light having a wavelength of 800 to 1700 nm may be used.

The temperature calculating unit 156 is, for example, a computer, and receives a signal from the light receiving unit 155 and calculates a temperature of the semiconductor wafer W based on the signal.

Figure 4:
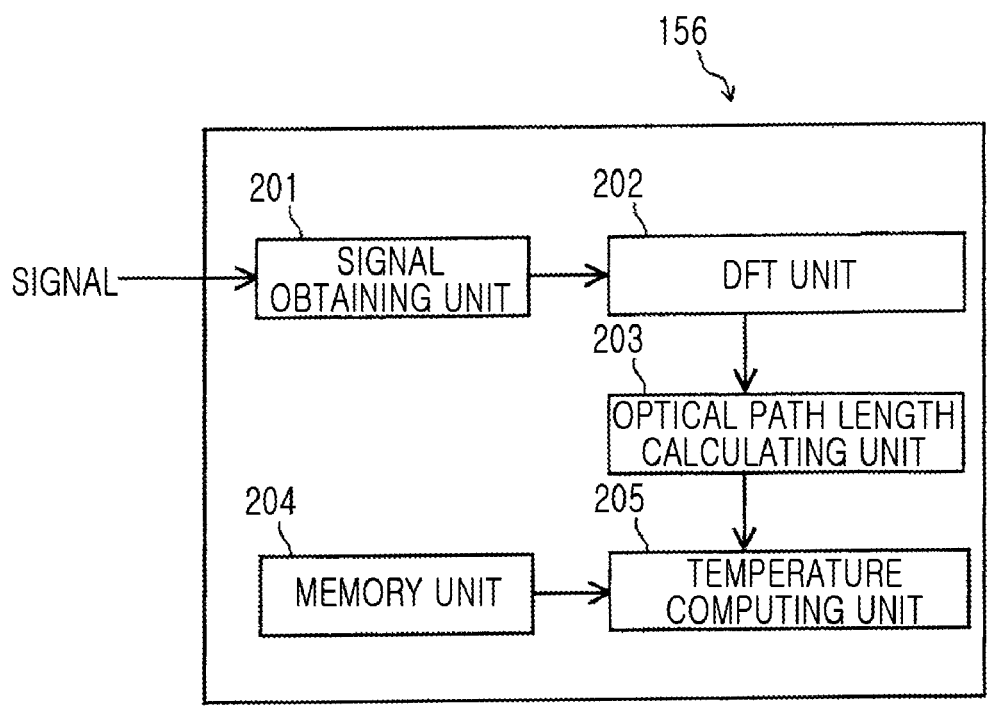
FIG. 4 is a diagram showing a function of a temperature calculating unit.

FIG. 4 is a diagram showing a function of the temperature calculating unit 156. The temperature calculating unit 156 includes a signal obtaining unit 201, a discrete Fourier transformation (DFT) unit 202, an optical path length calculating unit 203, a memory unit 204, and a temperature computing unit 205. Also, the function shown in FIG. 4 is performed by using hardware (for example, a hard disk drive (HDD), a central processing unit (CPU), and a memory) included in the temperature calculating unit 156. In detail, the function is performed when the CPU executes a program recorded on the HDD or the memory.

The signal obtaining unit 201 receives a discrete signal from the light receiving unit 155.

Figure 5:
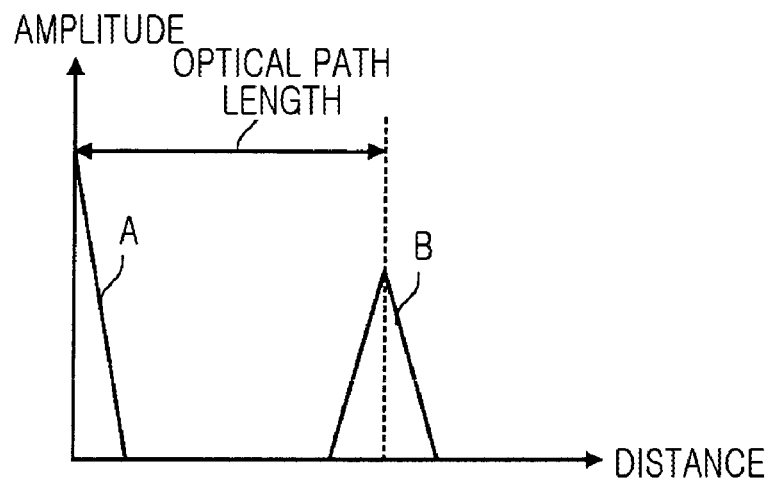
FIG. 5 is a diagram showing a signal after discrete Fourier transformation (DFT)

The DFT unit 202 performs DFT on the discrete signal obtained by the signal obtaining unit 201. Due to the DFT, the discrete signal from the light receiving unit 155 is converted to information regarding an amplitude and a distance. FIG. 5 is a graph showing a signal after DFT. A vertical axis of FIG. 5 represents an amplitude and a horizontal axis of FIG. 5 represents a distance.

The optical path length calculating unit 203 calculates an optical path length based on the information regarding the amplitude and the distance obtained by the DFT unit 202. In detail, an optical path length between a peak A and a peak B shown in FIG. 5 is calculated. The peak A and the peak B shown in FIG. 5 are caused by interference between a reflected light from a surface H and a reflected light from a rear surface R of the semiconductor wafer W which is an object to be measured, and a difference in the optical path length is dependent on a temperature of the semiconductor wafer W. This is because when a temperature of the semiconductor wafer W is changed, an optical path length between the surface H and the rear surface R of the semiconductor wafer W is changed due to a change in the thermal expansion and refractive index of the semiconductor wafer W.

Figure 6:
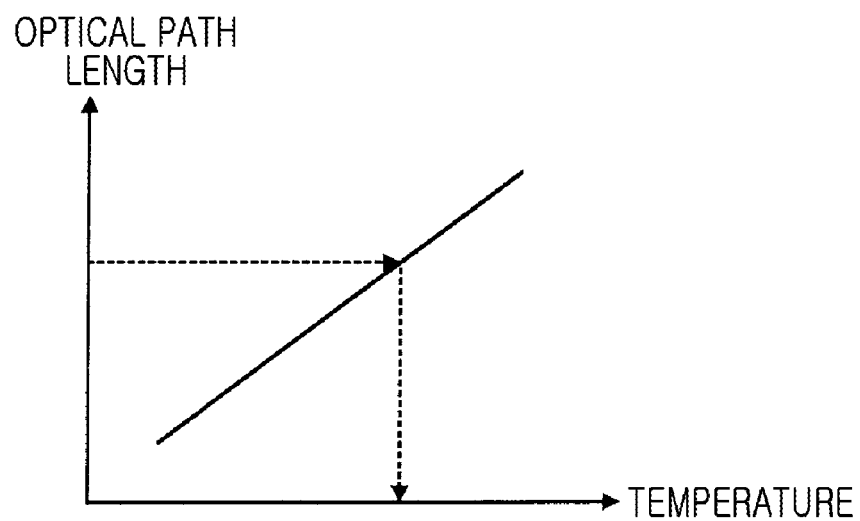
FIG. 6 is a graph showing a relationship between an optical path length and a temperature, which is stored in a memory unit.

A relationship between an optical path length and a temperature shown in FIG. 6 is stored in the memory unit 204. An optical path length between the peak A and the peak B shown in FIG. 5 is dependent on a temperature of the semiconductor wafer W as described above. Accordingly, since a relationship between an optical path length between the peak A and the peak B and a temperature of the semiconductor wafer W is stored in the memory unit 204 in advance, a temperature of the semiconductor wafer W can be calculated based on the optical path length calculated by the optical path length calculating unit 203.

Also, a relationship between an optical path length and a temperature shown in FIG. 6 may be measured through actual experiments and the like and the relationship may be stored in the memory unit 204, or may be calculated from a property of the semiconductor wafer formed of Si and stored in the memory unit 204. The memory unit 204 is, for example, a nonvolatile memory such as a flash memory or a ferroelectric random-access memory (FeRAM).

The temperature computing unit 205 calculates a temperature of the semiconductor wafer W which is an object to be measured based on the optical path length calculated from the optical path length calculating unit 203 by referring to the memory unit 204.

Operation of Temperature Measuring Apparatus 100

Next, an operation of the temperature measuring apparatus 100 according to the first embodiment will be explained.

The multi-wavelength light source 110 emits a measurement light at predetermined time intervals (in time slots).

Figure 7:
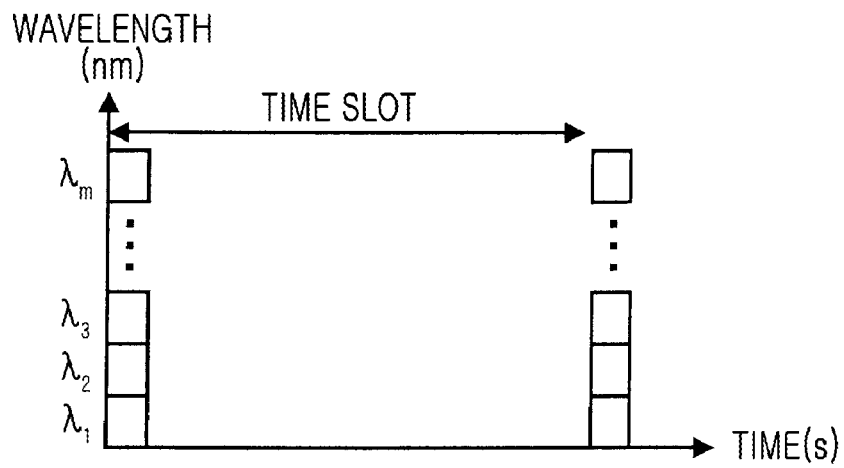
FIG. 7 is a graph showing a relationship between a wavelength of a light emitted from a multi-wavelength light source and time.

FIG. 7 is a graph showing a relationship between a wavelength of a measurement light emitted from the multi-wavelength light source 110 and time. A vertical axis of FIG. 7 represents a wavelength (nm) and a horizontal axis of FIG. 7 represents time (s). Since a measurement light is emitted at predetermined time intervals from the multi-wavelength light source 110 as shown in FIG. 7, a measurement light having m wavelength bands $\lambda_1$ through $\lambda_m$ is emitted at predetermined time intervals.

A measurement light emitted from the multi-wavelength light source 110 is input to the branching filter 130 through the optical circulator 120.

The branching filter 130 wavelength-divides a multi-wavelength light input from the optical circulator 120 into m measurement lights respectively having wavelength bands $\lambda_1$ through $\lambda_m$ and outputs the m measurement lights. The measurement lights respectively having the wavelength bands $\lambda_1$ through $\lambda_m$ are respectively input to the processing chambers $PC_1$ through $PC_m$.

Figure 8:
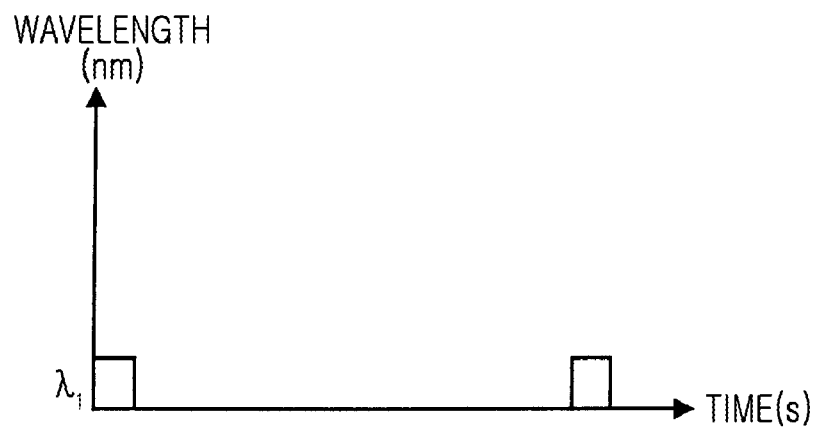
FIG. 8 is a graph showing a relationship between a wavelength of a measurement light input to a substrate processing apparatus and time.

FIG. 8 is a graph showing a relationship between a wavelength of a measurement light input to the processing chamber $PC_1$ and time. A vertical axis of FIG. 8 represents a wavelength (nm) and a horizontal axis of FIG. 8 represents time (s). Only a measurement light having the wavelength band $\lambda_1$ from among the m measurement lights respectively having the wavelength bands $\lambda_1$ through $\lambda_m$ obtained by the branching filter 130 is input to the processing chamber $PC_1$. Accordingly, as shown in FIG. 8, the measurement light having the wavelength band $\lambda_1$ is repeatedly input to the processing $PC_1$ at predetermined time intervals.

The splitter 140 divides the measurement light having the wavelength band $\lambda_1$ into first through nth measurement lights. The first through nth measurement lights from the splitter 140 are respectively transmitted to measurement points $P_1$ through $P_n$ of the semiconductor wafer W through the collimator fibers $F_1$ through $F_n$.

The first through nth measurement lights transmitted to the measurement points $P_1$ through $P_n$ are reflected by surfaces H and rear surfaces R of the measurement points $P_1$ through $P_n$, and then are output to the branching filter 130 through the splitter 140. Also, as described above, interference occurs when the first through nth measurement lights are reflected by the surfaces H and the rear surfaces R of the measurement points $P_1$ through $P_n$.

Figure 9:
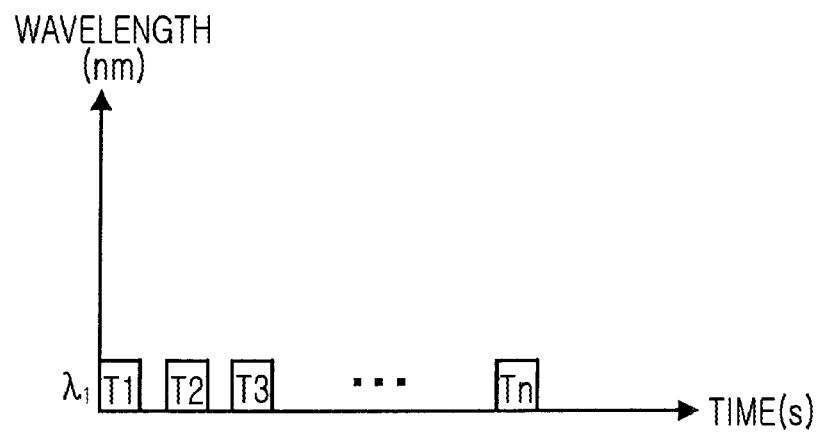
FIG. 9 is a graph showing a relationship between a wavelength of a reflected light output from the substrate processing apparatus and time.

FIG. 9 is a graph showing a relationship between a wavelength of a reflected light input to the branching filter 130 from the splitter 140 of the processing chamber $PC_1$ and time. A vertical axis of FIG. 9 represents a wavelength (nm) and a horizontal axis of FIG. 9 represents time (s). Since the collimator fibers $F_1$ through $F_n$ are configured to have different lengths as described above, reflected lights from the collimator fibers $F_1$ through $F_n$ are output from the splitter 140 at different times as shown in FIG. 9.

Reflected lights from the processing chambers $PC_1$ through $PC_m$ are input to the branching filter 130, are wavelength-combined by the branching filter 130, and are input to the signal processing apparatus 150 through the optical circulator 120.

Figure 10:
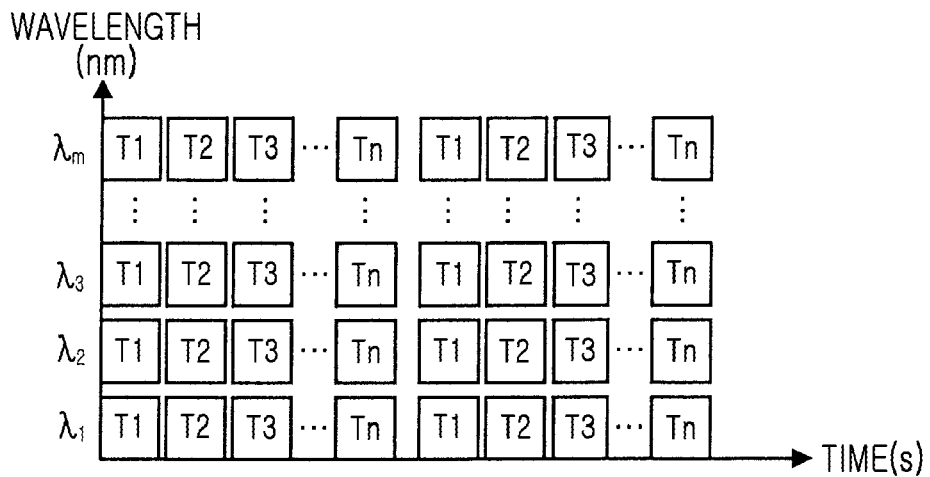
FIG. 10 is a graph showing a relationship between wavelengths of reflected lights input to a branching filter and time.

FIG. 10 is a graph showing a relationship between wavelengths of reflected lights input to the signal processing apparatus 150 from the optical circulator 120 and time. A vertical axis of FIG. 10 represents a wavelength (nm) and a horizontal axis of FIG. 10 represents time (s). Reflected lights from the processing chambers $PC_1$ through $PC_m$ are wavelength-combined and then input to the signal processing apparatus 150, and first through nth reflected lights are input at different times for each of the m wavelength bands $\lambda_1$ through $\lambda_m$ as shown in FIG. 10.

A reflected light input to the branching filter 151 of the signal processing apparatus 150 is wavelength-divided into reflected lights respectively having wavelength bands $\lambda_1$ through $\lambda_m$ by the branching filter 151, and one of the reflected lights having the wavelength bands $\lambda_1$ through $\lambda_m$ are selected and outputted by the multiplexer 152.

Figure 11:
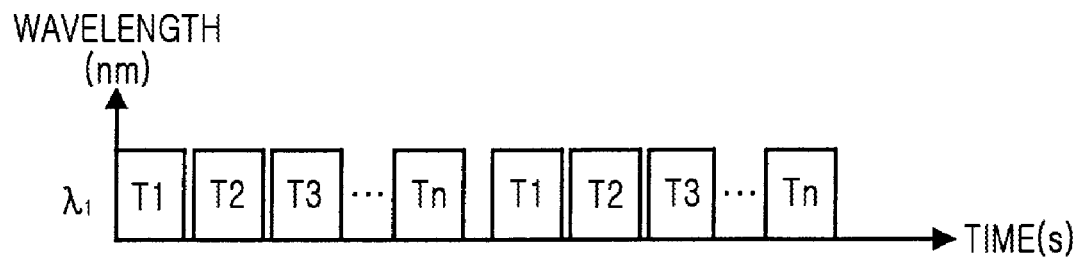
FIG. 11 is a graph showing a relationship between a wavelength of reflected lights output from a multiplexer and time.

FIG. 11 is a graph showing a relationship between a wavelength of reflected lights output from the multiplexer 152 and time. A vertical axis of FIG. 11 represents a wavelength (nm) and a horizontal axis of FIG. 11 represents time. A reflected light output from the multiplexer 152 has a selected wavelength band as shown in FIG. 11. Also, in FIG. 11, a selected wavelength band of the multiplexer 152 is the wavelength band $\lambda_1$.

A reflected light output from the multiplexer 152 is input to the splitter 153. The reflected light input to the splitter 153 is divided into two lights, and one light is input to the timing signal generating unit 152 and the other light is input to the light receiving unit 155.

The timing signal generating unit 154 generates a timing signal based on a measurement light input from the splitter 153 and inputs the timing signal to the temperature calculating unit 156.

Figure 12:
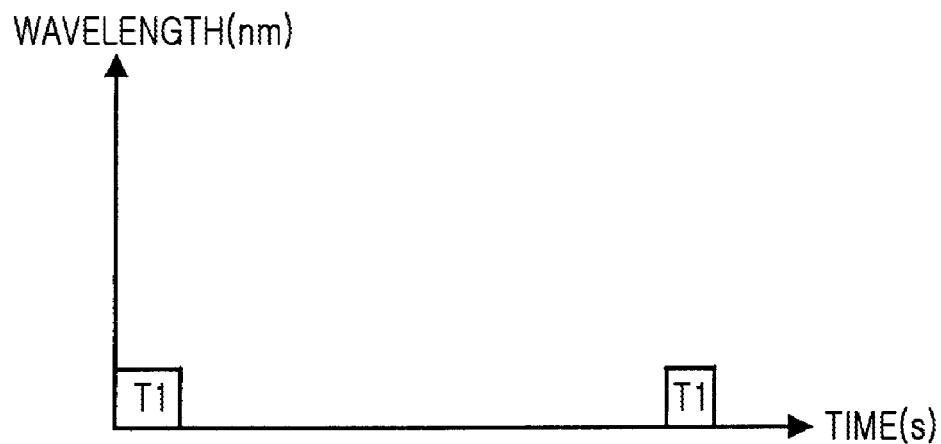
FIG. 12 is a graph showing an example where a reflected light having a wavelength band $\lambda_1$ is received.

The light receiving unit 155 receives a reflected light from the splitter 153. In FIG. 12, the light receiving unit 155 receives a signal having the wavelength band $\lambda_1$.

Figure 13A:
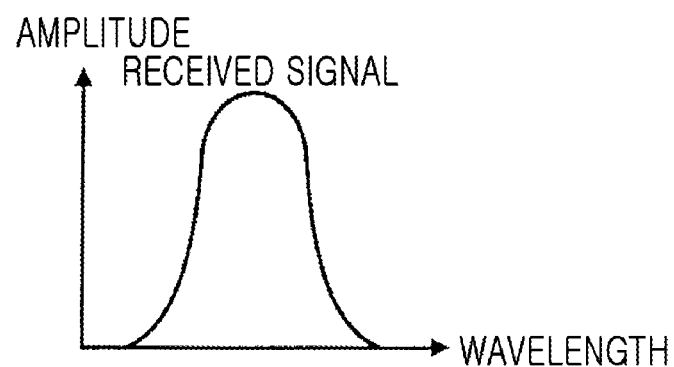
FIGS. 13A and 13B are diagrams for explaining generation of a discrete signal by using a light receiving unit.
Figure 13B:
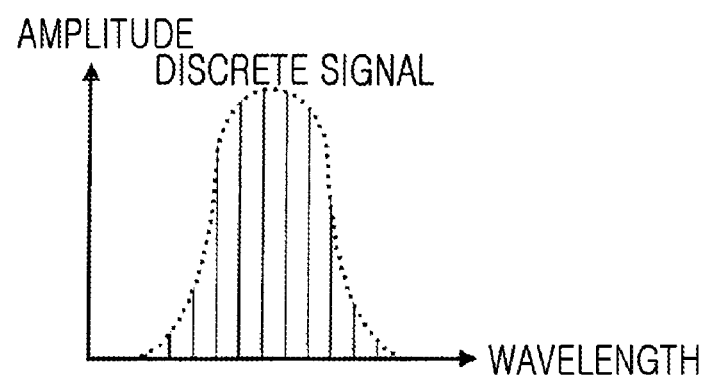

The light receiving unit 155 converts the received reflected light to a discrete signal transformed to have predetermined wavelengths and outputs the signal. FIGS. 13A and 13B are graphs for explaining generation of a discrete signal by using the light receiving unit 155. A reflected light (see FIG. 13A) input to the light receiving unit 155 is output as a discrete signal (see FIG. 13B) transformed to have a plurality of wavelengths by the light receiving unit 155.

The signal obtaining unit 201 receives the discrete signal from the light receiving unit 155.

The DFT unit 202 performs DFT on the signal obtained by the signal obtaining unit 201.

The optical path length calculating unit 203 calculates an optical path length based on information regarding an amplitude and a distance transformed by the DFT unit 202.

The temperature computing unit 205 calculates a temperature of the semiconductor wafer W which is an object to be measured based on the optical path length calculated by the optical path length calculating unit 203 by referring to the memory unit 204.

As described above, since the temperature measuring apparatus 100 according to the first embodiment uses the multi-wavelength light source 110 as a light source, a measurement light from the multi-wavelength light source 110 is wavelength-divided into a plurality of (m) measurement lights respectively having wavelength bands $\lambda_1$ through $\lambda_m$ by the branching filter 130, and each of measurement lights having the wavelength bands $\lambda_1$ through $\lambda_m$ is again divided into a plurality of (n) lights by the splitter 130, temperatures of more measurement points can be simply measured. Also, since a reflected light from each of measurement points is converted into a discrete signal by the light receiving unit 155 and an optical path length is calculated by performing DFT on the discrete signal, and since a reference mirror does not need to be mechanically operated unlike a case where an optical path length is calculated by using interference with a reflected light from a reference mirror, temperatures of measurement points can be very rapidly measured and thus can be efficiently measured.

Modified Example of First Embodiment

Figure 14:
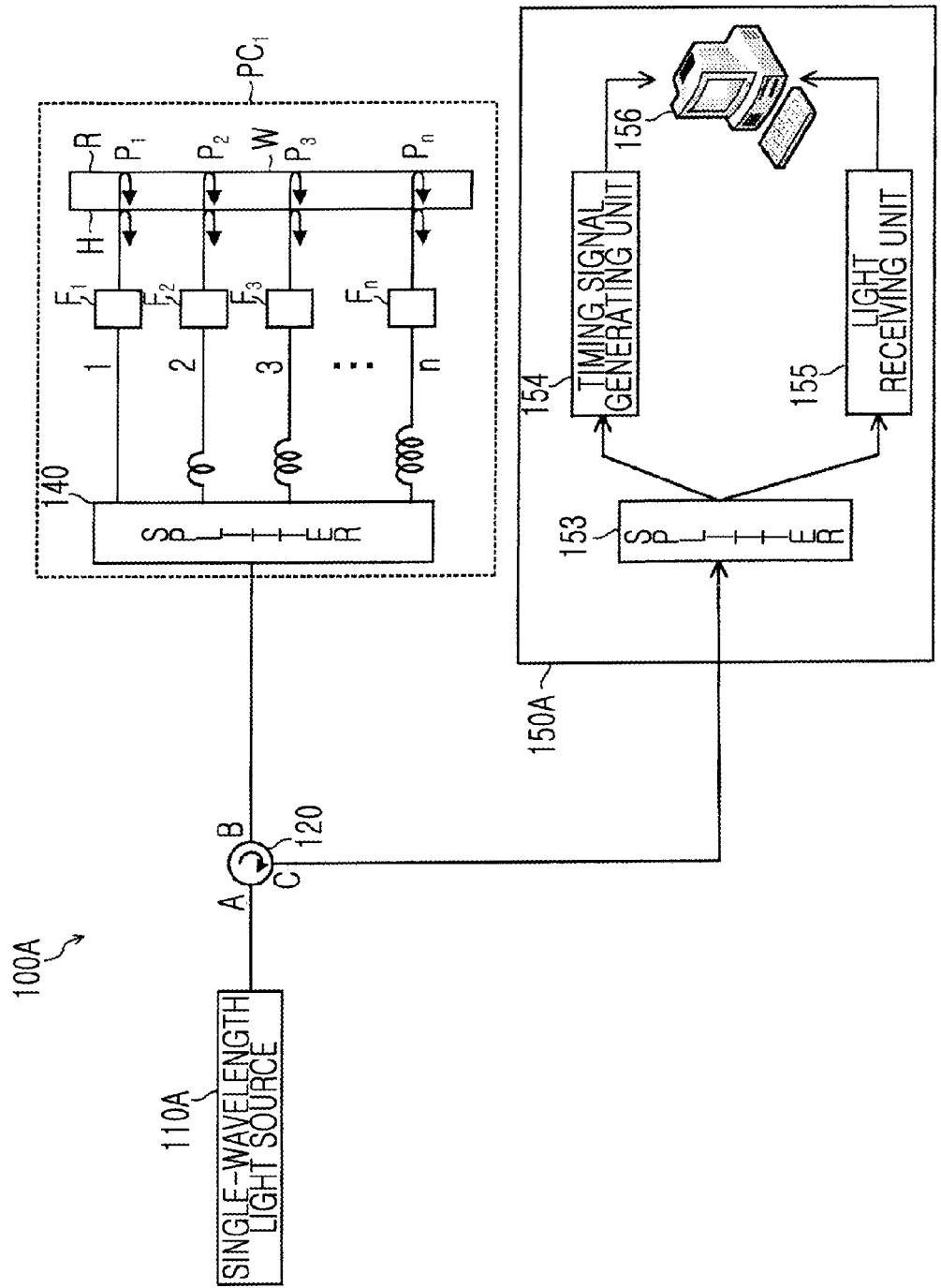
FIG. 14 is a diagram showing a configuration of a temperature measuring apparatus according to a modified example of the first embodiment.

FIG. 14 is a diagram showing a configuration of a temperature measuring apparatus 100A according to a modified example of the first embodiment. The temperature measuring apparatus 100A according to the modified example of the first embodiment is different from the temperature measuring apparatus 100 according to the first embodiment in that a single-wavelength light source 110A instead of the multi-wavelength light source 110 is used as a light source and a signal processing apparatus 150A does not include the branching filter 151 and the multiplexer 152.

The reason why the signal processing apparatus 150A does not include the branching filter 151 and the multiplexer 152 is that since the single-wavelength light source 110A is used as a light source, a light from the single-wavelength light source 110A does not need to be wavelength-divided. Other configurations are the same as those of the temperature measuring apparatus 100 according to the first embodiment, and the same components are denoted by the same reference numerals.

As described above, since the temperature measuring apparatus 100A according to the modified example of the first embodiment uses the single-wavelength light source 110A as a light source and does not include a branching filter and a multiplexer, temperatures of a plurality of measurement points can be measured by using a simple configuration. Also, like the temperature measuring apparatus 100 according to the first embodiment, since a reflected light from each of measurement points is converted into a discrete signal by the light receiving unit 155 and an optical path length is calculated by performing DFT on the discrete signal, and since a reference mirror does not need to be mechanically operated, temperatures of the measurement points can be very rapidly measured and thus can be efficiently measured. Other effects are the same as those of the temperature measuring apparatus 100 according to the first embodiment.

Second Embodiment

Figure 15:
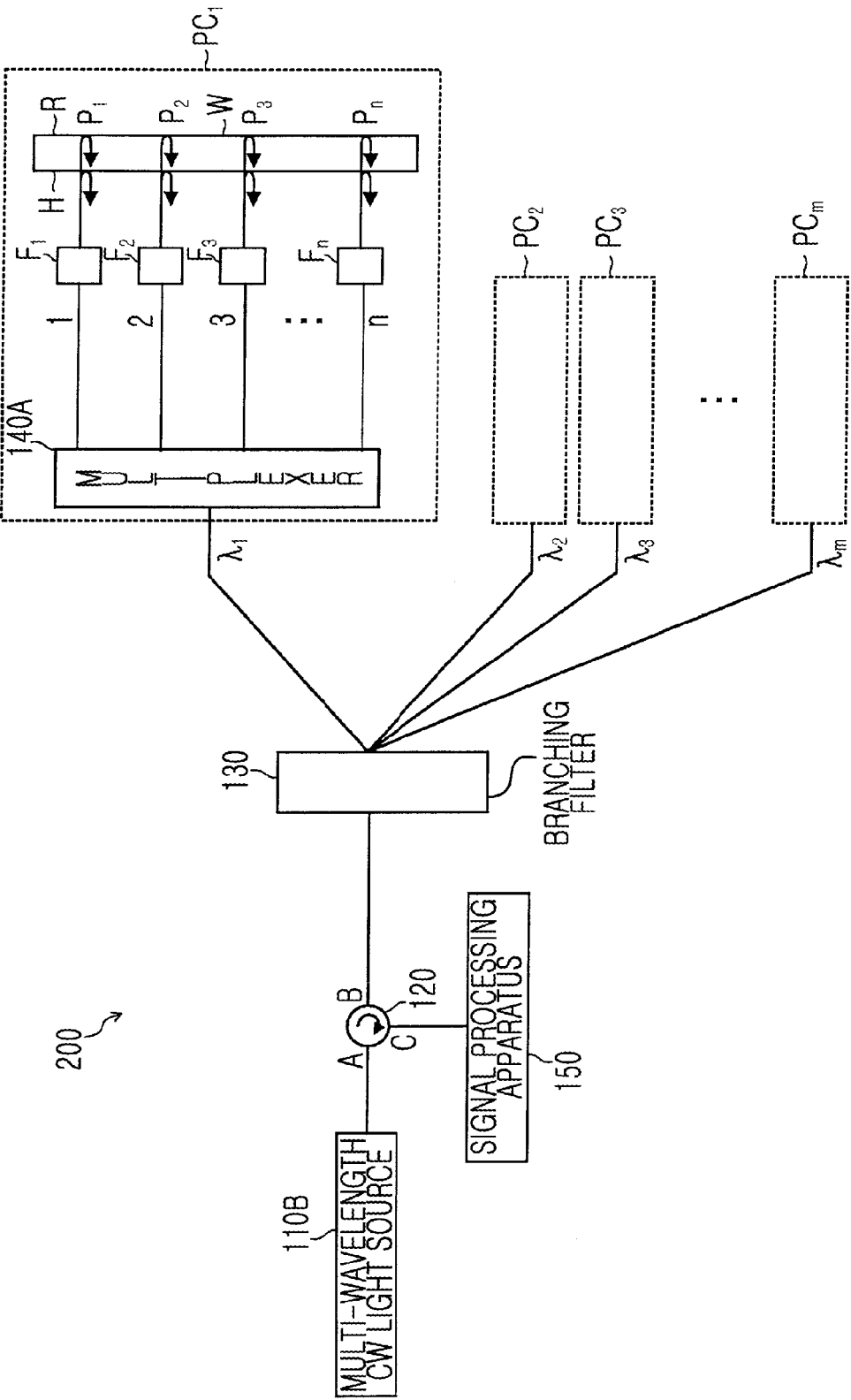
FIG. 15 is a diagram showing a configuration of a temperature measuring apparatus according to a second embodiment.

FIG. 15 is a diagram showing a configuration of a temperature measuring apparatus 200 according to a second embodiment. While the temperature measuring apparatus 100 according to the first embodiment forms time slots by emitting a measurement light from the multi-wavelength light source 110 at predetermined time intervals, the temperature measuring apparatus 200 according to the second embodiment uses a multi-wavelength continuous wave (CW) light source 110B which continuously emits a multi-wavelength light, includes a multiplexer 140A (first dividing unit) instead of the splitter 140, and forms time slots by using the multiplexer 140A. Since other configurations of the temperature measuring apparatus 200 are the same as those of the temperature measuring apparatus 100 according to the first embodiment, the same components are denoted by the same reference numerals and a repeated explanation thereof will not be given.

Next, an operation of the temperature measuring apparatus 200 according to the second embodiment will be explained.

Figure 16:
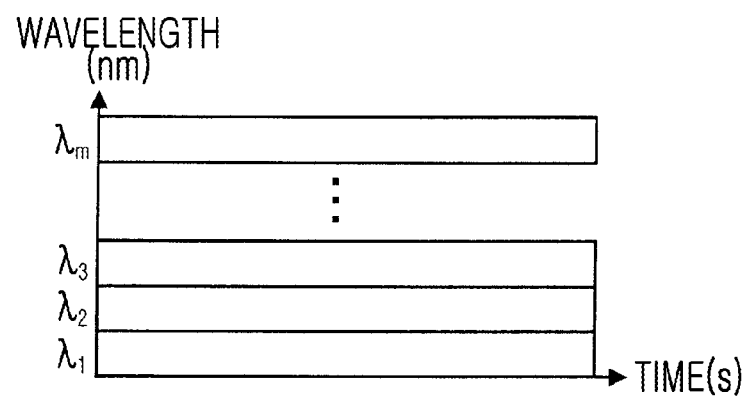
FIG. 16 is a graph showing a relationship between a wavelength of a measurement light emitted from a multi-wavelength light source and time.

The multi-wavelength CW light source 110B continuously emits a measurement light obtained by multiplexing lights having a plurality of (m) wavelength bands $\lambda_1$ through $\lambda_m$. FIG. 16 is a graph showing a relationship between a wavelength of a measurement light emitted from the multi-wavelength CW light source 110B and time. A vertical axis of FIG. 16 represents a wavelength (nm) and a horizontal axis represents time (s). As shown in FIG. 16, a measurement light having a plurality of (m) wavelength bands $\lambda_1$ through $\lambda_m$ is continuously emitted from the multi-wavelength CW light source 110B. At this time, time slots are not formed.

A measurement light emitted from the multi-wavelength CW light source 110B is input to the branching filter 130 through the optical circulator 120.

The measurement light input to the branching filter 130 is wavelength-divided into m measurement lights respectively having wavelength bands $\lambda_1$ through $\lambda_m$, and then the m measurement lights are output. The m measurement lights respectively having the wavelength bands $\lambda_1$ through $\lambda_m$ are respectively input to different processing chambers $PC_1$ through $PC_m$.

Figure 17:
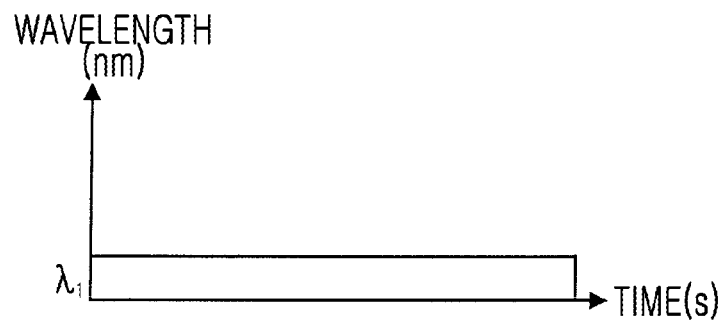
FIG. 17 is a graph showing a relationship between a wavelength of a measurement light input to a substrate processing apparatus and time.

FIG. 17 is a graph showing a relationship between a wavelength of a measurement light input to the multiplexer 140A of the processing chamber $PC_1$ and time. A vertical axis of FIG. 17 represents a wavelength (nm) and a horizontal axis of FIG. 17 represents time (s). Only a measurement light having the wavelength band $\lambda_1$ from among the m measurement lights respectively having the wavelength bands $\lambda_1$ through $\lambda_m$ obtained by the branching filter 130 is input to the processing chamber $PC_1$. Accordingly, as shown in FIG. 17, only the measurement light having the wavelength band $\lambda_1$ is input to the processing chamber $PC_1$.

The multiplexer 140A of the processing chamber $PC_1$ switches to one from among the collimator fibers $F_1$ through $F_n$ at predetermined time intervals and sequentially inputs the measurement light having the wavelength band $\lambda_1$ input from the branching filter 130 to a collimator fiber selected by the switching.

Figure 18:
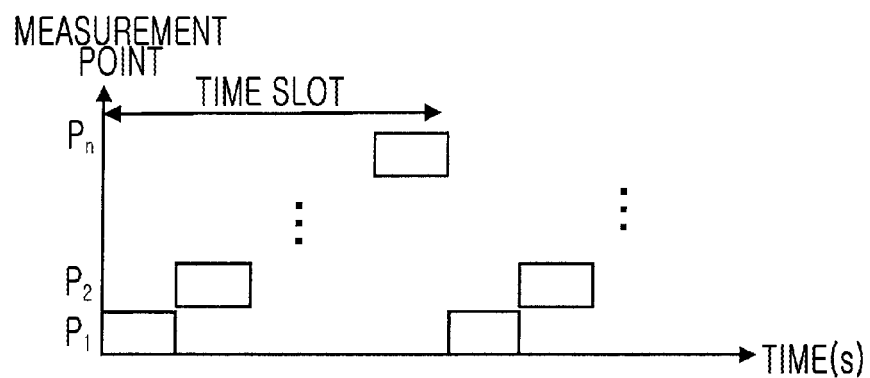
FIG. 18 is a graph showing a relationship between a measurement light input to each of measurement points and time.

FIG. 18 is a graph showing a relationship between a measurement light input to each of the measurement points $P_1$ through $P_n$ and time. A vertical axis of FIG. 18 represents measurement points (1 through n) and a horizontal axis of FIG. 18 represents time (s). Since one of the measurement points $P_1$ through $P_n$ is selected at predetermined time intervals by the multiplexer 140A, a measurement light is wavelength-divided with respect to time and inputted to each of the measurement points $P_1$ through $P_n$ as shown in FIG. 18. That is, time slots are formed by the multiplexer 140A.

A measurement light transmitted to a measurement point is reflected by a surface H and a rear surface R of each of the measurement points $P_1$ through $P_n$, and then is input to the branching filter 130 through the multiplexer 140A.

Figure 19:
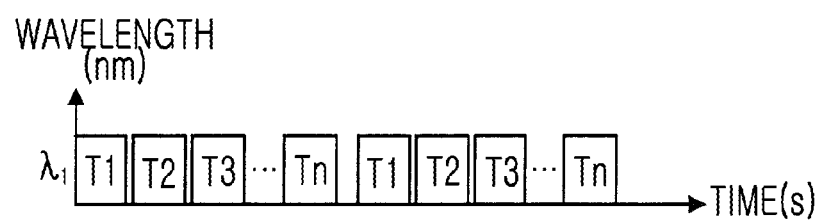
FIG. 19 is a graph showing a relationship between a wavelength of reflected lights output from the substrate processing apparatus and time.

FIG. 19 is a graph showing a relationship between a wavelength of reflected lights input to the branching filter 130 from the multiplexer 140A of the processing chamber $PC_1$ and time. A vertical axis of FIG. 19 represents a wavelength (nm) and a horizontal axis of FIG. 19 represents time (s). Since times slots are formed by the multiplexer 140A as described above, reflected lights from the measurement points $P_1$ through $P_n$ are input at different times to the branching filter 130 as shown in FIG. 19.

Reflected lights from the processing chambers $PC_1$ through $PC_m$ are input to the branching filter 130, are wavelength-combined, and are input to the signal processing apparatus 150 through the optical circulator 120. Also, an operation of the signal processing apparatus 150 is the same as an operation of the signal processing apparatus 150 of the temperature measuring apparatus 100 according to the first embodiment, and thus a repeated explanation thereof will not be given.

As described above, since the temperature measuring apparatus 200 according to the second embodiment uses the multi-wavelength CW light source 110B as a light source, a measurement light from the multi-wavelength CW light source 110B is wavelength-divided into a plurality of (m) measurement lights respectively having wavelength bands $\lambda_1$ through $\lambda_m$ by the branching filter 130, and each of the m measurement lights having the wavelength bands $\lambda_1$ through $\lambda_m$ is divided into a plurality of (n) lights by using the multiplexer 140A, temperatures of more measurement points can be simply measured. Also, since a reflected light from each of measurement points is converted to a discrete signal by using the light receiving unit 155 and an optical path length is calculated by performing DFT on the discrete signal, and since a reference mirror does not need to be mechanically operated unlike a case where an optical path length is calculated by using interference with a reflected light from a reference mirror, temperatures of measurement points can be very rapidly measured and thus can be efficiently measured. Other effects are the same as those of the temperature measuring apparatus 100 according to the first embodiment.

Modified Example of Second Embodiment

Figure 20:
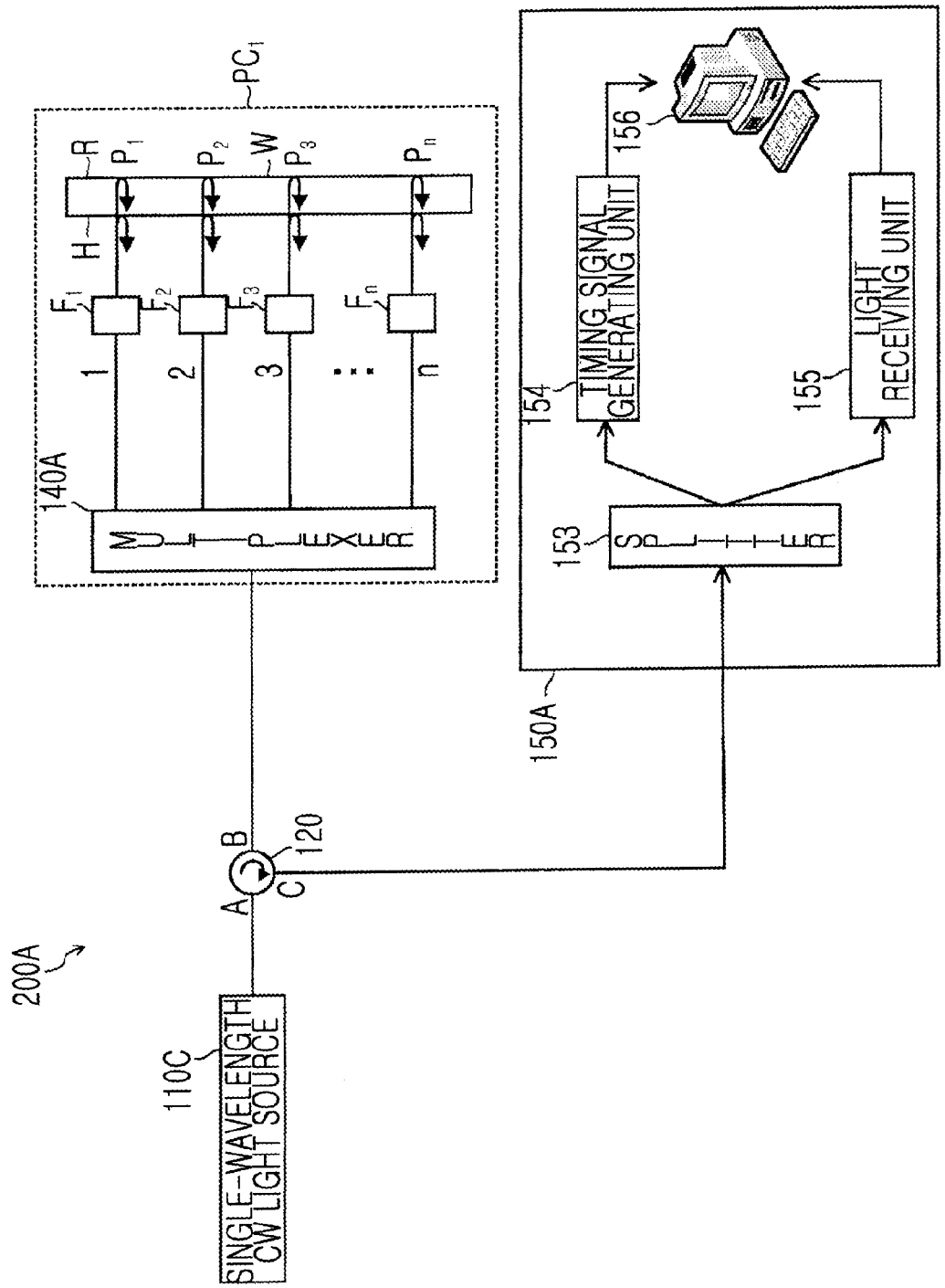
FIG. 20 is a diagram showing a configuration of a temperature measuring apparatus according to a modified example of the second embodiment.

FIG. 20 is a diagram showing a configuration of a temperature measuring apparatus 200A according to a modified example of the second embodiment. The temperature measuring apparatus 200A according to the modified example of the second embodiment is different from the temperature measuring apparatus 200 according to the second embodiment in that a single-wavelength CW light source 110C instead of the multi-wavelength CW light source 110B is used as a light source and the signal processing apparatus 150A does not include the branching filter 151 and the multiplexer 152.

The reason why the signal processing apparatus 150A does not include the branching filter 151 and the multiplexer 152 is that since the single-wavelength CW light source 110C is used as a light source, a light from the single-wavelength CW light source 110C does not need to be wavelength-divided. Other configurations are the same as those of the temperature measuring apparatus 200 according to the second embodiment, and the same components are denoted by the same reference numerals.

As described above, since the temperature measuring apparatus 200A according to the modified example of the second embodiment uses the single-wavelength CW light source 110C as a light source and does not include a branching filter and a multiplexer, temperatures of a plurality of measurement points can be measured with a simple configuration. Also, like in the temperature measuring apparatus 200 according to the second embodiment, since a reflected light from each of measurement points is converted to a discrete signal by using the light receiving unit 155, an optical path length is calculated by performing DFT on the discrete signal, and a reference mirror does not need to be mechanically operated, temperatures of the measurement points can be very rapidly measured and thus can be efficiently measured. Other effects are the same as those of the temperature measuring apparatus 200 according to the second embodiment.

Third Embodiment

Figure 21:
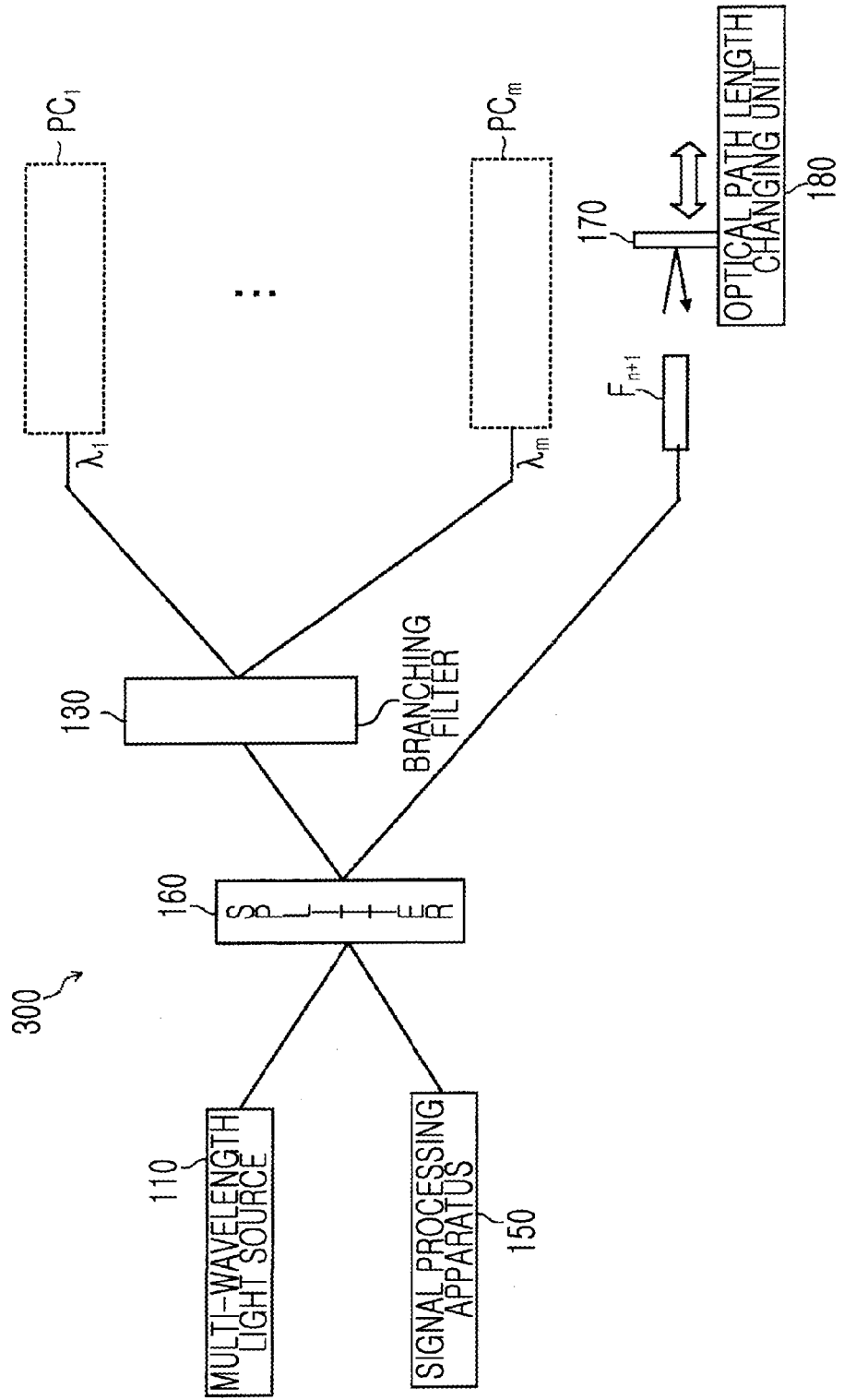
FIG. 21 is a diagram showing a configuration of a temperature measuring apparatus according to a third embodiment.

FIG. 21 is a diagram showing a configuration of a temperature measuring apparatus 300 according to a third embodiment. The temperature measuring apparatus 300 according to the third embodiment is different from the temperature measuring apparatus 100 according to the first embodiment in that a splitter 160 (second dividing unit) instead of the optical circulator 120 is included and a reference light reflecting unit 170 and an optical path length changing unit 180 are included. Since other configurations are the same as those of the temperature measuring apparatus 100 according to the first embodiment, the same components are denoted by the same reference numerals and a detailed explanation thereof will not be given.

The splitter 160 divides a measurement light from the multi-wavelength light source 110 into a light for temperature measurement and a reference light. The splitter 160 is, for example, an optical fiber coupler. However, the present embodiment is not limited thereto, and for example, an optical waveguide type branching filter or a semi-transmissive mirror, may be used as long as it can divide a measurement light into a light for temperature measurement and a reference light.

The reference light reflecting unit 170 reflects the reference light from the splitter 160. The reference light reflecting unit 170 includes, for example, a reference mirror. Examples of the reference mirror may include a corner cube prism and a plane mirror. From among the corner cube prism and the plane mirror, considering that a reflected light is parallel to an incident light, a corner cube prism may be used. However, the present embodiment is not limited thereto, and the reference light reflecting unit 170 may include a delay line (which is the same as an optical path changing unit such as a piezo tube type delay line that will be explained below) as long as the delay line can reflect a reference light.

The optical path length changing unit 180 includes a driving unit for driving the reference light reflecting unit 170 in one direction parallel to a direction in which a reference light is incident such as a motor. As such, an optical path length of a reference light reflected from a reference mirror can be changed by driving the reference mirror in one direction. The driving unit included in the optical path length changing unit 180 is controlled by the signal processing apparatus 150.

The driving unit for driving the reference light reflecting unit 170 may include, for example, a stepping motor for driving the reference light reflecting unit 170 in a direction (indicated by an arrow in FIG. 21) parallel to a direction in which a reference light is incident. If a stepping motor is used, a movement distance of the reference light reflecting unit 170 can be easily detected by using a driving pulse of the motor.

However, the optical path length changing unit 180 is not limited to the motor as long as it can change an optical path length of a light reflected from the reference light reflecting unit 170, and the optical path length changing unit 180 may include, for example, a voice coil motor type delay line using a voice coil motor, a piezo tube type delay line, a linear motion stage type delay line, or a stacked piezo type delay line.

Since the temperature measuring apparatus 300 according to the third embodiment includes the reference light reflecting unit 170, and thus a peak of an interference waveform detected by the signal processing apparatus 150 is increased, the peak of the interference waveform can be easily detected. Other effects are the same as those of the temperature measuring apparatus 100 according to the first embodiment.

Also, an attenuator may be provided as a light attenuating unit in an optical path of a reference light obtained by the splitter 160. The attenuator is used to attenuate an intensity of a reflected light to be close to intensities of reflected lights of first through nth measurement lights. An attenuation ratio which attenuates a level of a passing light to, for example, about $(1/n)^{1/2}$, can be appropriately used.

If the attenuator is included, a difference between a level of a reflected light of the reference light and a level of a reflected light of the measurement light becomes only a difference in a reflection ratio of the semiconductor wafer W which is an object to be measured, and if the splitter 160 does not exist, the same effect as a case of one point measurement is obtained, thereby preventing a signal to noise (S/N) ratio from decreasing.

Modified Example of Third Embodiment

Figure 22:
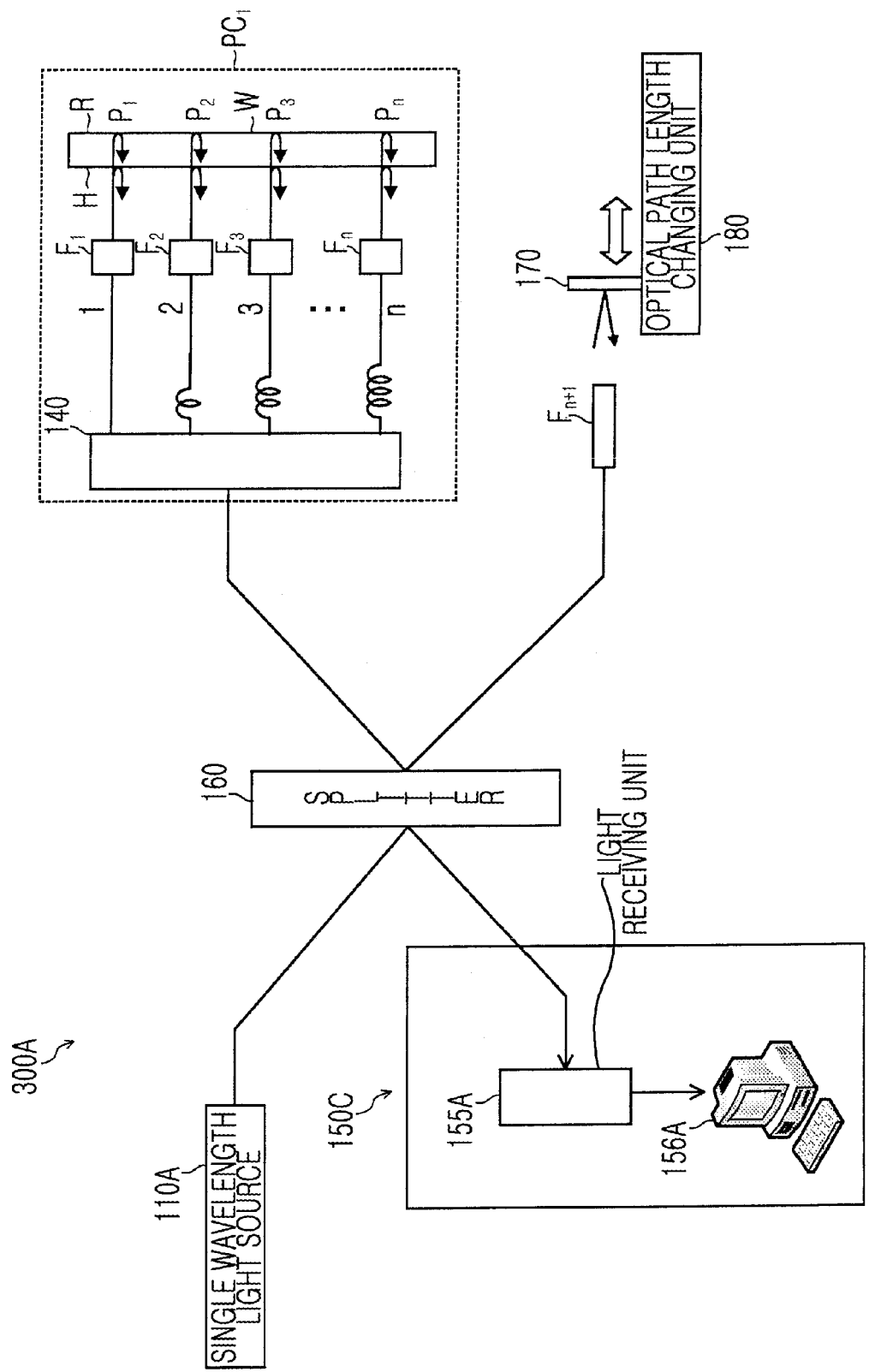
FIG. 22 is a diagram showing a configuration of a temperature measuring apparatus according to a modified example of the third embodiment.

FIG. 22 is a diagram showing a configuration of a temperature measuring apparatus 300A according to a modified example of the third embodiment. The temperature measuring apparatus 300A according to the modified example of the third embodiment is different from the temperature measuring apparatus 300 according to the third embodiment in that the single-wavelength light source 110A instead of a multi-wavelength light source is used as a light source, the temperature measuring apparatus 300A does not include the optical circulator 120, and a signal processing apparatus 150C does not include the branching filter 151 and the multiplexer 152.

The reason why the optical circulator 120, the branching filter 151, and the multiplexer 152 are not included is that since the single-wavelength light source 110A is used as a light source, a light from the single-wavelength light source 110A does not need to be wavelength-divided. Other configurations are the same as those of the temperature measuring apparatus 300 according to the third embodiment, and the same components are denoted by the same reference numerals.

As described above, since the temperature measuring apparatus 300A according to the modified example of the third embodiment uses the single-wavelength light source 110A as a light source and does not include a branching filter and a multiplexer, temperatures of a plurality of measurement points can be measured by using a simple configuration. Other effects are the same as those of the temperature measuring apparatus 300 according to the third embodiment.

Fourth Embodiment

Figure 23:
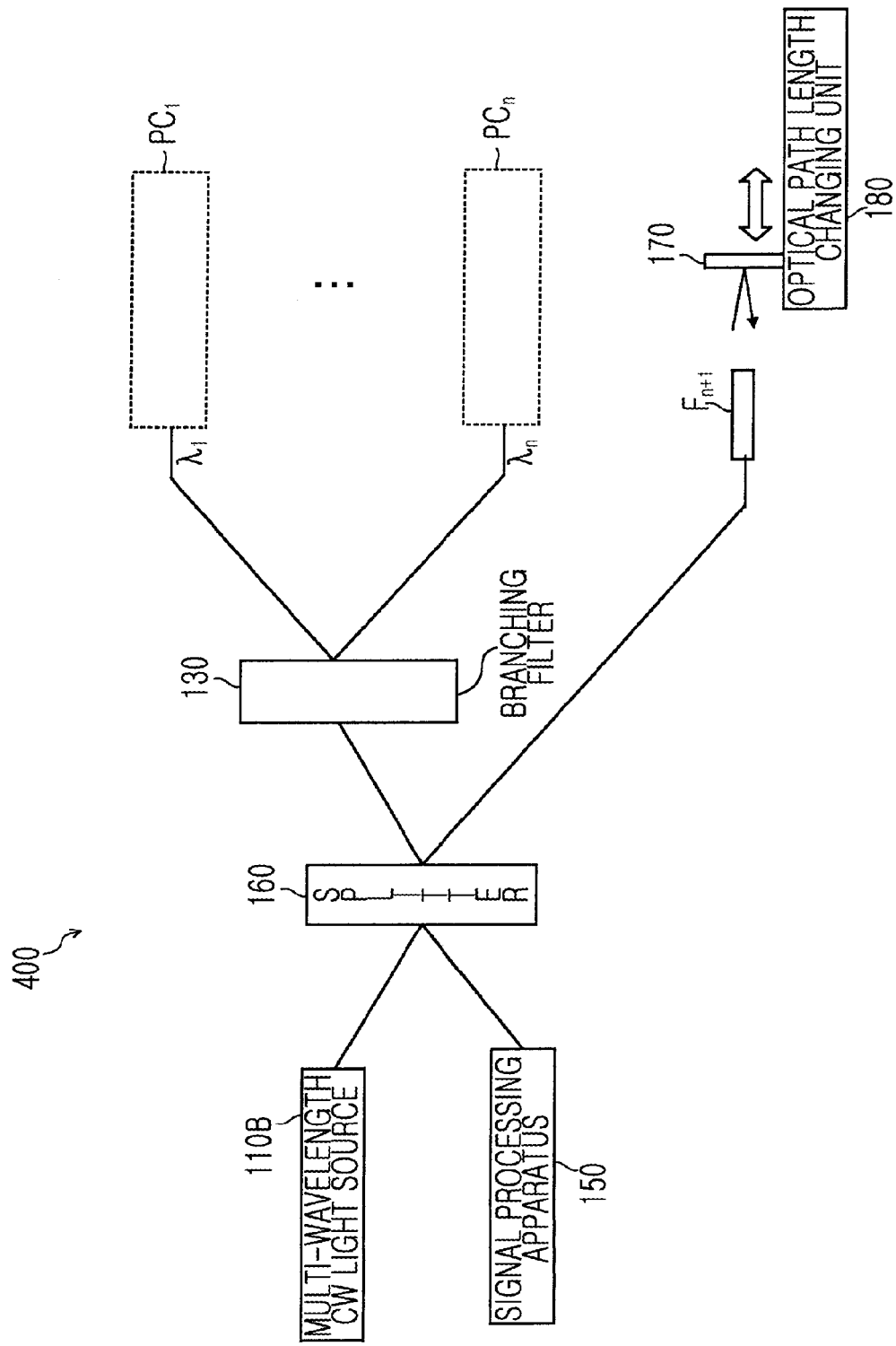
FIG. 23 is a diagram showing a configuration of a temperature measuring apparatus according to a fourth embodiment.

FIG. 23 is a diagram showing a configuration of a temperature measuring apparatus 400 according to a fourth embodiment. The temperature measuring apparatus 400 according to the fourth embodiment is different from the temperature measuring apparatus 200 according to the second embodiment in that the splitter 160 instead of the optical circulator 120 is used, and the temperature measuring apparatus 400 includes the reference light reflecting unit 170 and the optical path length changing unit 180. Since other configurations are the same as those of the temperature measuring apparatus 200 according to the second embodiment or the temperature measuring apparatus 300 according to the third embodiment, the same components are denoted by the same reference numerals and a repeated explanation thereof will not be given.

Since the temperature measuring apparatus 400 according to the fourth embodiment includes the reference light reflecting unit 170, and thus a peak of an interference waveform detected by the signal processing apparatus 150 is increased, the peak of the interference waveform can be easily detected. Other effects are the same as those of the temperature measuring apparatus 200 according to the second embodiment. Also, an attenuator may be provided as a light attenuating unit in an optical path of the reference light obtained by the splitter 160, like in the temperature measuring apparatus 300 according to the third embodiment.

Modified Example of Fourth Embodiment

Figure 24:
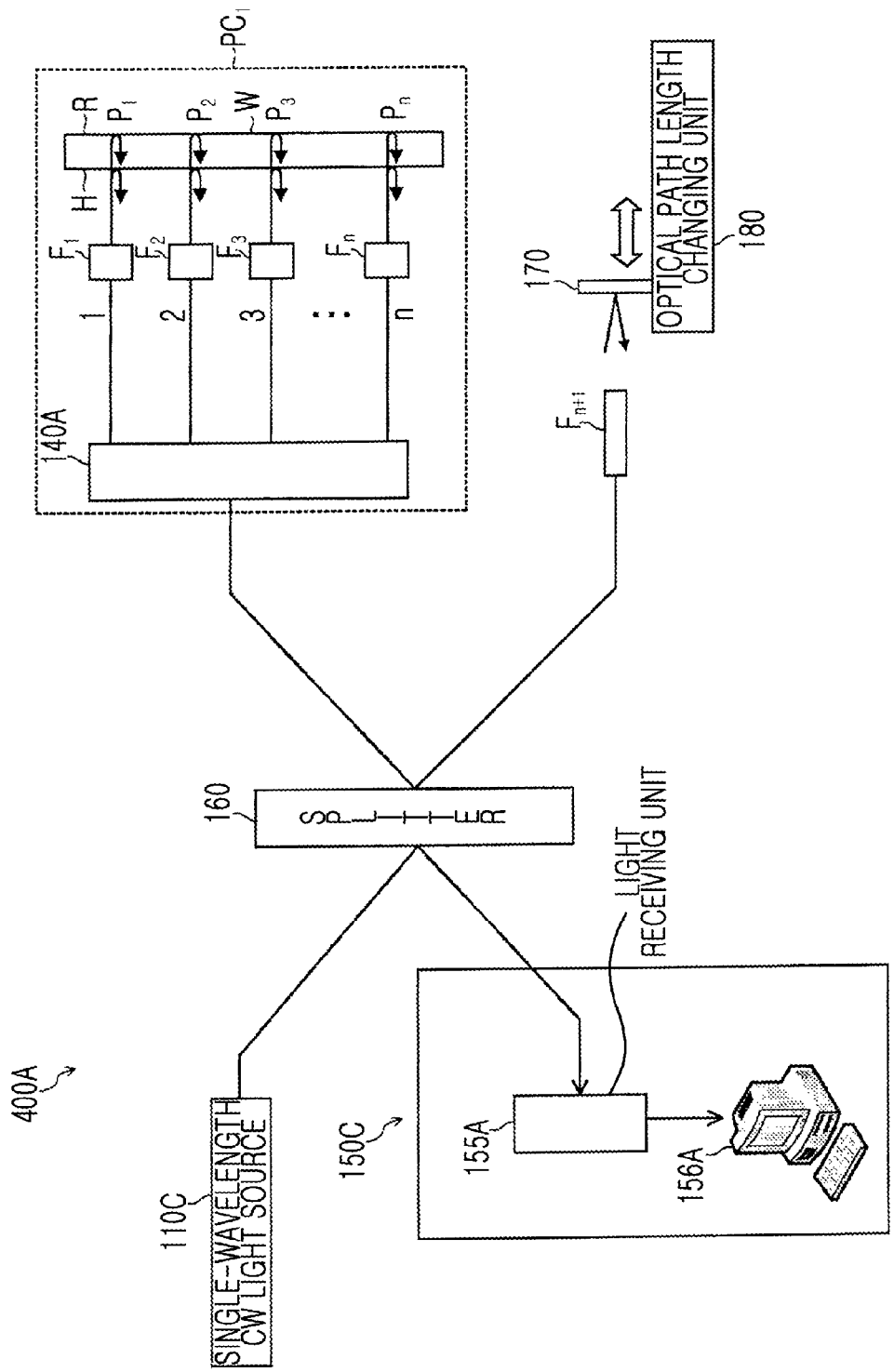
FIG. 24 is a diagram showing a configuration of a temperature measuring apparatus according to a modified example of the fourth embodiment.

FIG. 24 is a diagram showing a configuration of a temperature measuring apparatus 400A according to a modified example of the fourth embodiment. The temperature measuring apparatus 400A according to the modified example of the fourth embodiment is different from the temperature measuring apparatus 400 according to the fourth embodiment in that the single-wavelength CW light source 110C instead of the multi-wavelength CW light source 110B is used as a light source and the signal processing apparatus 150C does not include the branching filter 151 and the multiplexer 152.

The reason why the signal processing apparatus 150C does not include the branching filter 151 and the multiplexer 152 is that since the single-wavelength CW light source 110C is used as a light source, a light from the single-wavelength CW light source 110C does not need to be wavelength-divided. Other configurations are the same as those of the temperature measuring apparatus 400 according to the fourth embodiment, and the same components are denoted by the same reference numerals.

As described above, since the temperature measuring apparatus 400A according to the modified example of the fourth embodiment uses the single-wavelength CW light source 110C as a light source and does not include a branching filter and a multiplexer, temperatures of a plurality of measurement points can be measured by using a simple configuration. Other effects are the same as those of the temperature measuring apparatus 400 according to the fourth embodiment.

Fifth Embodiment

Figure 25:
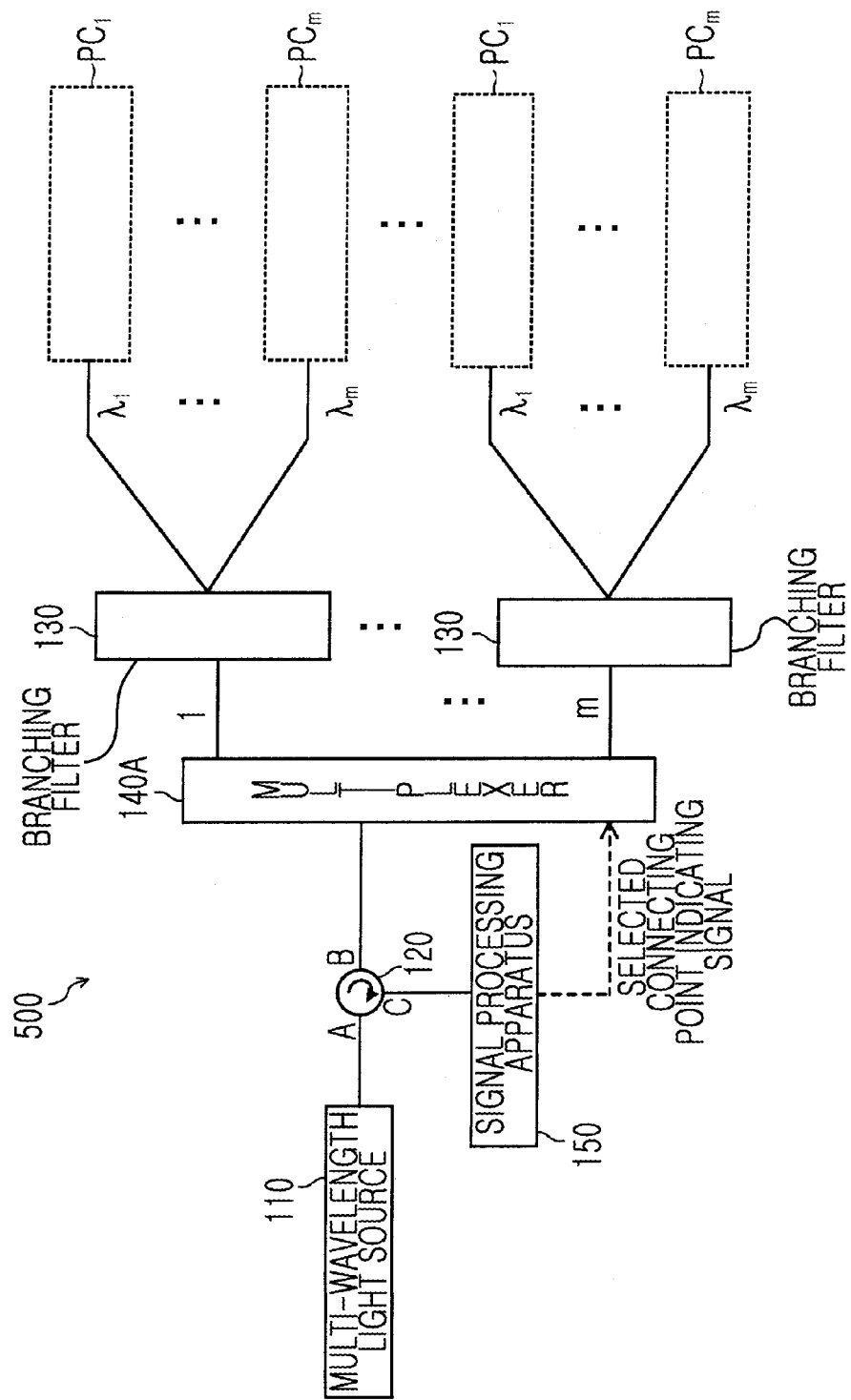
FIG. 25 is a diagram showing a configuration of a temperature measuring apparatus according to a fifth embodiment.

FIG. 25 is a diagram showing a configuration of a temperature measuring apparatus 500 according to a fifth embodiment. The temperature measuring apparatus 500 according to the fifth embodiment is different from the temperature measuring apparatus 100 according to the first embodiment in that the multiplexer 140A is additionally disposed between the optical circulator 120 and the branching filters 130. In the temperature measuring apparatus 500 according to the fifth embodiment, since the multiplexer 140A is additionally disposed between the optical circulator 120 and the branching filters 130, a network which connects a plurality of processing chambers in a tree shape can be established. Also, temperatures of more measurement points can be simply measured by sequentially switching to a connecting point for a measurement light output from the multiplexer 140A. Also, the number of multiplexers 140A disposed between the optical circulator 120 and the branching filter 130 is not limited to 1, and two or more multiplexers may be included. Also, the configuration of the temperature measuring apparatus 500 according to the fifth embodiment is applicable to the temperature measuring apparatuses 200, 300, and 400 according to the second through fourth embodiments.

Modified Example of Fifth Embodiment

Figure 26:
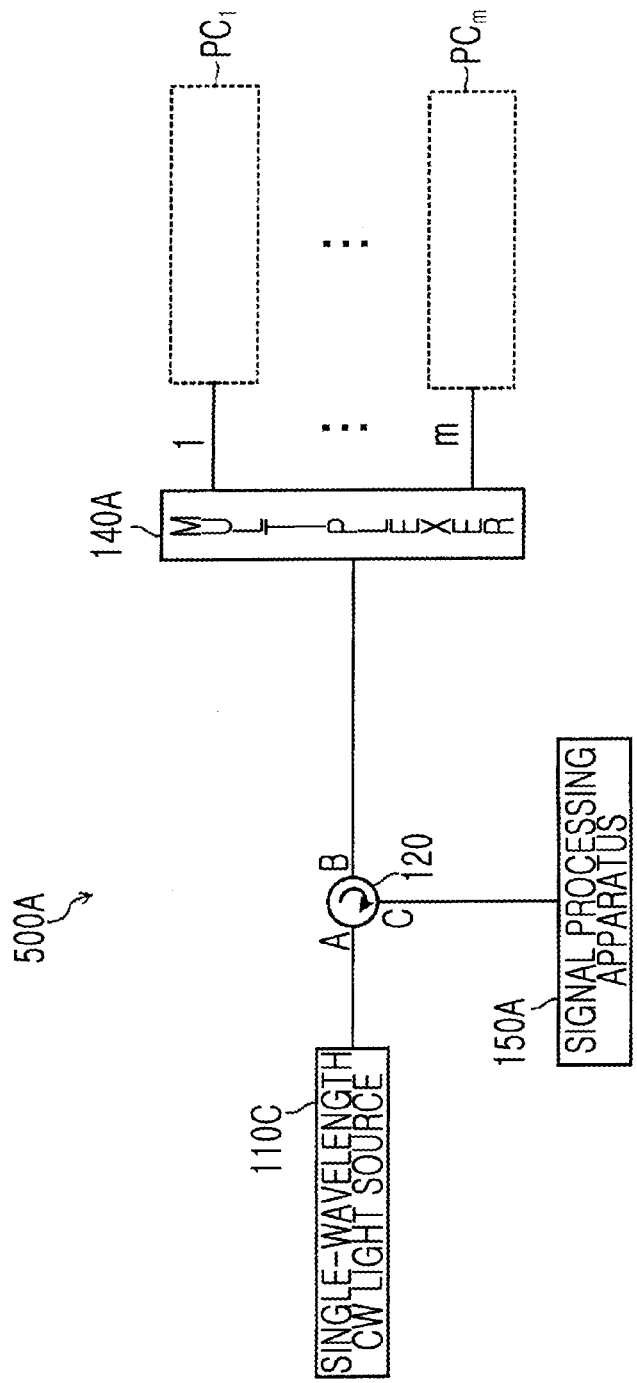
FIG. 26 is a diagram showing a configuration of a temperature measuring apparatus according to a modified example of the fifth embodiment.

FIG. 26 is a diagram showing a configuration of a temperature measuring apparatus 500A according to a modified example of the fifth embodiment. The temperature measuring apparatus 500A according to the modified example of the fifth embodiment is different from the temperature measuring apparatus 100A according to the modified example of the first embodiment in that the multiplexer 140A is additionally disposed between the optical circulator 120 and the processing chambers $PC_1$ through $PC_m$. Since the temperature measuring apparatus 500A according to the modified example of the fifth embodiment additionally includes the optical circulator 120 and the multiplexer 140A disposed between the optical circulator 120 and the processing chambers $PC_1$ through $PC_m$, a network which connects a plurality of processing chambers can be established. Also, temperatures of more measurement points can be simply measured by sequentially switching to a connecting point for a measurement light output from the multiplexer 140A. Also, the number of multiplexers 140A disposed between the optical circulator 120 and the processing chambers $PC_1$ through $PC_m$ is not limited to 1, and two or more multiplexers may be included. Also, the configuration of the temperature measuring apparatus 500A according to the modified example of the fifth embodiment is applicable to the temperature measuring apparatuses 200A, 300A, and 400A according to the modified examples of the second through fourth embodiments.

Other Embodiment

Figure 27:
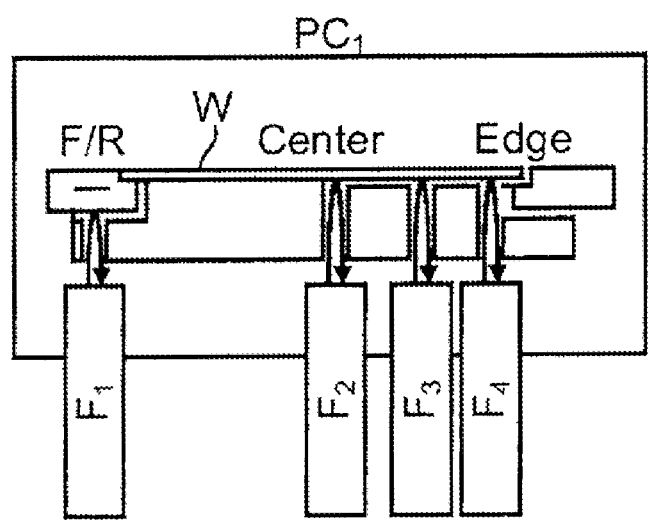
FIG. 27 is a diagram showing a configuration of a temperature measuring apparatus according to another embodiment.

Also, the present invention is not limited to the above embodiments, and various changes in form and details may be made therein without departing from the scope of the present invention. For example, a temperature of a focus ring F/R instead of the semiconductor wafer W may be measured as a temperature of an object to be measured as shown in FIG. 27. Since the temperature of the focus ring F/R affects a result of a process of the semiconductor wafer W, it is very important to measure the temperature of the focus ring F/R in real time. Alternatively, a temperature of a stage on which the semiconductor wafer A is held, a temperature of a processing chamber, or the like may be measured.

Also, although a light from a multi-wavelength light source is divided into m lights having wavelength bands different from one another and each of the m lights is divided into n lights in the first through fifth embodiments shown in FIGS. 1, 15, 21, 23, and 25, each of lights having, for example, wavelength bands A through $\lambda_{m-1}$, may be divided into n lights and a light having a wavelength band $\lambda_m$ may be divided into n−1 lights. That is, each of the lights respectively having the wavelength bands A through $\lambda_m$ may be divided into a different number of lights.

Also, a shutter unit for turning on or off emission of first through nth measurement lights to the semiconductor wafer W, instead of the splitter 140 or the multiplexer in the modified examples of the first through fifth embodiments, may be provided. Due to the shutter unit, a temperature of a desired measurement point can be measured by emitting a measurement light to only the desired measurement point.

According to the present invention, since a multi-wavelength light source including a light having a plurality of (m) wavelength bands is used as a light source and the light including the plurality of wavelength bands is divided into a plurality of (n) lights, temperatures of more measurement points can be simply measured.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A temperature measuring apparatus comprising:
a light source;
a first wavelength-dividing unit which wavelength-divides a light from the light source into m lights whose wavelength bands are different from one another;
m first dividing units which divide each of the m lights from the first wavelength-dividing unit into n lights;
a transmitting unit which transmits lights from the m first dividing unit to measurement points of an object to be measured;
a light receiving unit which receives a light reflected by each of the measurement points; and
a temperature calculating unit which calculates a temperature of each of the measurement points based on a waveform of the light received by the light receiving unit.

2. The temperature measuring apparatus of claim 1, wherein the transmitting unit comprises transmission paths through which lights from the m first dividing units are transmitted to different n measurement points of the object to be measured with respect to each of the m wavelength bands.

3. The temperature measuring apparatus of claim 1, further comprising:
a second wavelength-dividing unit which divides a light reflected by each of the measurement points into m lights whose wavelength bands are different from one another; and
an input unit which switches, at predetermined time intervals, to one of the m lights obtained by the second wavelength-dividing unit and inputs a light selected by the switching to the light receiving unit.

4. The temperature measuring apparatus of claim 1, wherein optical path lengths between each of the m first dividing units and n measurement points of the object to be measured corresponding to each of the m first dividing units are different from one another.

5. The temperature measuring apparatus of claim 1, wherein the light source repeatedly emits the light at predetermined time intervals.

6. The temperature measuring apparatus of claim 1, wherein each of the m first dividing units switches to one of the n lights at predetermined time intervals and inputs a light selected by the switching to the transmitting unit.

7. The temperature measuring apparatus of claim 1, wherein the object to be measured includes a semiconductor substrate and a focus ring buried around the semiconductor substrate.

8. The temperature measuring apparatus of claim 1, wherein the light receiving unit outputs the light reflected by each of the measurement points as a discrete waveform signal transformed to show a plurality of wavelengths with respect to each of the measurement points.

9. The temperature measuring apparatus of claim 8, further comprising a transformation unit which performs discrete Fourier transformation (DFT) on the waveform signal from the light receiving unit.

10. The temperature measuring apparatus of claim 1, further comprising:
    a second dividing unit which divides a light from the light source into a measurement light and a reference light;
    a reference light reflecting unit which reflects the reference light from the second dividing unit; and
    an optical path length changing unit which changes an optical path length of the reference light reflected by the reference light reflecting unit.

11. The temperature measuring apparatus of claim 10, further comprising a light attenuating unit which attenuates an intensity of the reference light reflected by the reference light reflecting unit to be close to intensities of lights reflected by the measurement points.

12. A temperature measuring method comprising:
    wavelength-dividing a light from a light source into m lights whose wavelength bands are different from one another by using a first wavelength-dividing unit;
    dividing each of the m lights from the first wavelength-dividing unit into n lights by using m first dividing units;
    transmitting lights from the m first dividing units to measurement points of an object to be measured by using a transmitting unit;
    receiving a light reflected by each of the measurement points by using a light receiving unit; and
    calculating a temperature of each of the measurement points based on a waveform of the light received by the light receiving unit.

13. The temperature measuring method of claim 12, wherein the transmitting unit comprises transmission paths through which lights from the m first dividing units are transmitted to n different measurement points of the object to be measured with respect to each of the m wavelength bands.

14. The temperature measuring method of claim 12, further comprising:
    dividing a light reflected by each of the measurement points into m lights whose wavelength bands are different from one another by using a second wavelength-dividing unit; and
    switching, at predetermined time intervals, to one of the m lights obtained by the second wavelength-dividing unit and inputting a light selected by the switching to the light receiving unit.

15. The temperature measuring method of claim 12, further comprising repeatedly emitting a light from the light source at predetermined time intervals.

16. The temperature measuring method of claim 12, wherein each of the m first dividing units switches to one of the n lights at predetermined time intervals and inputs a light selected by the switching to the transmitting unit.

17. The temperature measuring method of claim 12, wherein the object to be measured includes a semiconductor substrate and a focus ring buried around the semiconductor substrate.

18. The temperature measuring method of claim 12, further comprising generating the light received by the light receiving unit as a discrete waveform signal transformed to show a plurality of wavelengths with respect to each of the measurement points.

19. The temperature measuring method of claim 18, further comprising performing DFT on the waveform signal.

20. The temperature measuring method of claim 12, further comprising:
    dividing a light from the light source into a measurement light and a reference light by using a second dividing unit;
    reflecting the reference light from the second dividing unit by using a reference light reflecting unit; and
    changing an optical path length of the reference light reflected by the reference light reflecting unit by using an optical path length changing unit.

21. The temperature measuring method of claim 20, further comprising attenuating an intensity of the reference light reflected by the reference light reflecting unit to be close to intensities of lights reflected by the measurement points.

* * * * *